US011841705B2

(12) United States Patent
Goldman et al.

(10) Patent No.: US 11,841,705 B2
(45) Date of Patent: *Dec. 12, 2023

(54) SYSTEMS AND METHODS FOR ENERGY BASED AUTONOMOUS VEHICLE CONTROL

(71) Applicant: Uber Technologies, Inc., San Francisco, CA (US)

(72) Inventors: Brent Justin Goldman, San Francisco, CA (US); Mark Yen, San Francisco, CA (US); Shenglong Gao, San Francisco, CA (US); Konrad Julian Niemiec, Mountain View, CA (US); Jay A. Chen, Fremont, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,499

(22) Filed: Aug. 30, 2022

(65) Prior Publication Data

US 2023/0062664 A1 Mar. 2, 2023

Related U.S. Application Data

(63) Continuation of application No. 16/731,294, filed on Dec. 31, 2019, now Pat. No. 11,449,055.

(Continued)

(51) Int. Cl.
*G05D 1/00* (2006.01)
*H04L 67/125* (2022.01)
*G05D 1/02* (2020.01)

(52) U.S. Cl.
CPC ......... *G05D 1/0088* (2013.01); *H04L 67/125* (2013.01); *G05D 1/0225* (2013.01); *G05D 2201/0213* (2013.01)

(58) Field of Classification Search
CPC .............. G05D 1/0088; G05D 1/0225; G05D 2201/0213; H04L 67/125; H04W 4/021; H04W 4/44; G06Q 10/06311
See application file for complete search history.

(56) References Cited

U.S. PATENT DOCUMENTS 9,805,519 B2 * 10/2017 Ramanujam ..... G06Q 10/06311
9,811,086 B1 * 11/2017 Poeppel ............. G06Q 10/0631
(Continued)

FOREIGN PATENT DOCUMENTS

WO 2021076686 4/2021

OTHER PUBLICATIONS

"International Application Serial No. PCT US2020 055665, International Search Report dated Dec. 11, 2020", 3 pgs.

(Continued)

*Primary Examiner* — Michael J Zanelli
(74) *Attorney, Agent, or Firm* — SCHWEGMAN LUNDBERG & WOESSNER, P.A.

(57) ABSTRACT

Systems and methods for determining appropriate energy replenishment and controlling autonomous vehicles are provided. An example computer-implemented method can include obtaining one or more energy parameters associated with an autonomous vehicle. The method can include determining a refueling task for the autonomous vehicle based at least in part on the energy parameters associated with the autonomous vehicle. The refueling task comprises a first refueling task that is interruptible by a vehicle service assignment or a second refueling task that is not interruptible by the vehicle service assignment. The method can include communicating data indicative of the refueling task to the autonomous vehicle or to a second computing system that manages the autonomous vehicle. The method can include (Continued)

determining whether the refueling task for the autonomous vehicle has been accepted or rejected.

20 Claims, 8 Drawing Sheets

Related U.S. Application Data

(60) Provisional application No. 62/915,236, filed on Oct. 15, 2019.

(56) References Cited

U.S. PATENT DOCUMENTS

| | | | | |
|---|---|---|---|---|
| 10,042,359 | B1* | 8/2018 | Konrardy | G05D 1/0295 |
| 11,449,055 | B2 | 9/2022 | Goldman et al. | |
| 2016/0139600 | A1* | 5/2016 | Delp | B60K 37/06 |
| | | | | 701/26 |
| 2018/0081360 | A1* | 3/2018 | Bostick | G06Q 50/30 |
| 2018/0321688 | A1* | 11/2018 | Chase | G05D 1/0022 |
| 2019/0235487 | A1* | 8/2019 | Zhao | G08G 1/127 |
| 2021/0109524 | A1 | 4/2021 | Goldman et al. | |

OTHER PUBLICATIONS

"International Application Serial No. PCT US2020 055665, Written Opinion dated Dec. 11, 2020", 7 pgs.

"U.S. Appl. No. 16/731,294, Non Final Office Action dated Jan. 27, 2022", 7 pgs.

"U.S. Appl. No. 16/731,294, Response filed Apr. 27, 2022 to Non Final Office Action dated Jan. 27, 2022", 8 pgs.

"International Application Serial No. PCT US2020 055665, International Preliminary Report on Patentability dated Apr. 28, 2022", 9 pgs.

"U.S. Appl. No. 16/731,294, Notice of Allowance dated May 12, 2022", 7 pgs.

"European Application Serial No. 20803376.1, Response to Communication pursuant to Rules 161 and 162 filed Jan. 9, 2023", 25 pgs.

* cited by examiner

SYSTEMS AND METHODS FOR ENERGY BASED AUTONOMOUS VEHICLE CONTROL

RELATED APPLICATION

The present application is a continuation of and claims the benefit of priority of U.S. application Ser. No. 16/731,294, filed Dec. 31, 2019, which is based on and claims benefit of U.S. Provisional Patent Application No. 62/915,236 having a filing date of Oct. 15, 2019, each of which is incorporated by reference herein.

FIELD

The present disclosure relates generally to devices, systems, and methods for energy efficient autonomous vehicle control.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for autonomous vehicle energy replenishment. The method includes obtaining, by a computing system including one or more computing devices, one or more energy parameters associated with an autonomous vehicle. The method includes determining, by the computing system, a refueling task for the autonomous vehicle based at least in part on the energy parameters associated with the autonomous vehicle. The refueling task includes a first refueling task that is interruptible by a vehicle service assignment or a second refueling task that is not interruptible by the vehicle service assignment. The method includes communicating, by the computing system, data indicative of the refueling task to the autonomous vehicle or to a second computing system that manages the autonomous vehicle. The method includes determining, by the computing system, whether the refueling task for the autonomous vehicle has been accepted or rejected.

Another example aspect of the present disclosure is directed to a computing system including one or more processors and one or more tangible, non-transitory, computer readable media that collectively store instructions that when executed by the one or more processors cause the computing system to perform operations. The operations include obtaining one or more energy parameters associated with an autonomous vehicle. The operations include determining a refueling task for the autonomous vehicle based at least in part on the energy parameters associated with the autonomous vehicle. The refueling task includes a first refueling task that is interruptible by another vehicle task or a second refueling task that is not interruptible by the other vehicle task. The operations include communicating data indicative of the refueling task to the autonomous vehicle or to a second computing system associated with the autonomous vehicle and remote from the autonomous vehicle. The operations include determining whether the refueling task for the autonomous vehicle has been accepted or rejected.

Yet another example aspect of the present disclosure is directed to a computing system including one or more processors and one or more tangible, non-transitory, computer readable media that collectively store instructions that when executed by the one or more processors cause the computing system to perform operations. The operations include obtaining data indicative of a refueling task for an autonomous vehicle. The refueling task includes a first refueling task that is interruptible by another vehicle task or a second refueling task that is not interruptible by the other vehicle task. The operations include obtaining one or more vehicle conditions associated with the autonomous vehicle. The operations include determining whether to accept or reject the refueling task for the autonomous vehicle based at least in part on the one or more vehicle conditions associated with the autonomous vehicle. The operations include communicating data indicative of an acceptance or a rejection of the refueling task for the autonomous vehicle.

Other example aspects of the present disclosure are directed to systems, methods, vehicles, apparatuses, tangible, non-transitory computer-readable media, and memory devices for controlling autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
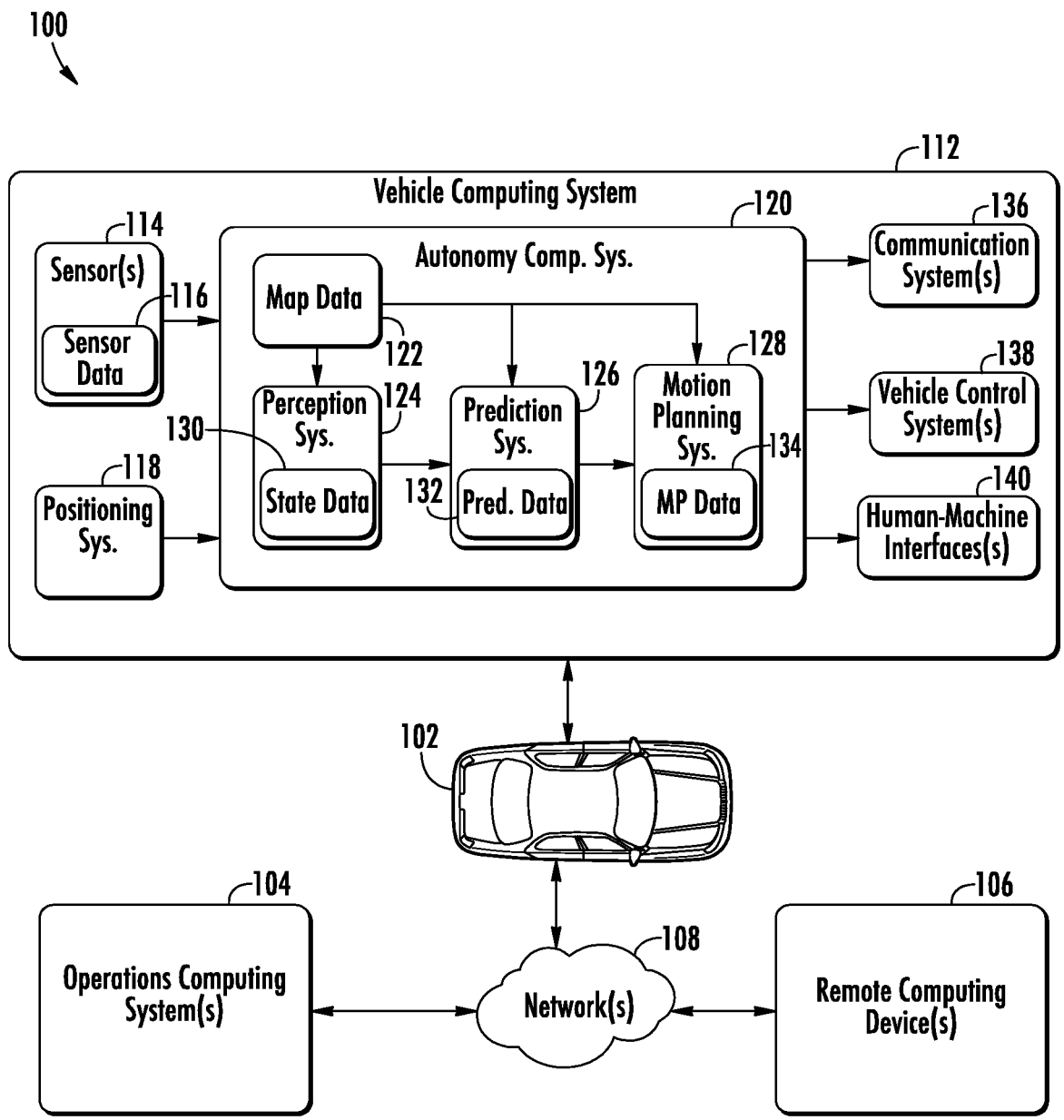
FIG. 1 depicts a block diagram of an example system for controlling an autonomous vehicle according to example embodiments of the present disclosure.

Example aspects of the present disclosure are directed to improved energy efficiency of autonomous vehicle operations. For instance, an autonomous vehicle can be utilized to perform vehicle services (e.g., transportation services, etc.). The vehicle services can be offered to users by a service entity (e.g., a company that offers and coordinates the provision of vehicle services). In the event that a user requests a vehicle service, an operations computing system of the service entity can send a vehicle service assignment (e.g., a trip request, demand job, etc.) to an autonomous vehicle that is online with the service entity. As the autonomous vehicle travels to complete vehicle service assignments its energy resources (e.g., combustible fuel, electric charge, etc.) may begin to dissipate. As such, it is important for the service entity to direct/request that the autonomous vehicles refuel at certain times. As used herein, refueling can refer to the refueling of combustible fuel (e.g., gasoline, etc.), re-charging of battery power, and/or obtaining any other type of power resource.

To help coordinate a more efficient approach to autonomous vehicle refueling, the service entity's operations computing system can analyze the current and/or future conditions of an autonomous vehicle and generate a certain type of refueling task for the autonomous vehicle. For example, the operations computing system can monitor the energy parameters of an autonomous vehicle (e.g., current energy level, energy efficiency, proximity to refueling stations, etc.) and/or other conditions (e.g., vehicle service demand, vehicle supply, etc.). The operations computing system can determine a specific refueling task for the autonomous vehicle based at least in part on the energy parameters and/or other conditions. In some implementations, the operations computing system can determine that the autonomous vehicle should undertake a first type of refueling task that is interruptible by other vehicle tasks (e.g., a "soft" refueling task). For example, in the event that the energy level of the autonomous vehicle is at or below 50%, but above 25%, capacity, the operations computing system can communicate the soft, interruptible refueling task to the autonomous vehicle. As such, the autonomous vehicle can travel to a service depot for refueling unless the autonomous vehicle is given another task such as, for example, a vehicle service assignment (e.g., to transport a user). In the event the autonomous vehicle receives the vehicle service assignment, the soft refueling task will be interrupted/cancelled and the autonomous vehicle will travel to undertake the vehicle service assignment (e.g., to pick-up the user). The autonomous vehicle may then return to the soft refueling task after completion of the service assignment (e.g., after dropping off the user). In some implementations, the operations computing system can determine that the autonomous vehicle should undertake a second type of refueling task that is not interruptible by other vehicle tasks (a "hard" refueling task). For example, in the event that the energy level of the autonomous vehicle is at or below a certain threshold (e.g., 25%), the operations computing system can communicate the hard, uninterruptible refueling task to the autonomous vehicle. As such, the autonomous vehicle can travel to a service depot for refueling and will be become unavailable for another task until the vehicle's energy level returns to a certain level. In this way, the systems and methods of the current technology can help to improve the timing and efficiency of autonomous vehicle energy replenishment so as to maximize the opportunity for the autonomous vehicle to perform other tasks (e.g., vehicle service assignments).

More particularly, an autonomous vehicle (e.g., ground-based vehicle, aerial vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the vehicle to communicate with a computing system that is remote from the vehicle such as, for example, that of a service entity.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. For example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system of the service entity can help to coordinate the performance of vehicle services by autonomous vehicles. For instance, the operations computing system can include a service platform. The service platform can include a plurality of back-end services and front-end interfaces, which are accessible via one or more APIs. For example, an autonomous vehicle and/or another computing system (that is remote from the autonomous vehicle) can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system (e.g., the service platform) so that the vehicle computing system can communicate with the operations computing system via a network. Once online, the operations computing system can communicate a vehicle service assignment indicative of the requested vehicle services and/or other data to the autonomous vehicle.

The autonomous vehicles utilized by the service entity to provide vehicle services can be associated with a fleet of the service entity or a third party. For example, the service entity may own, lease, etc. a fleet of autonomous vehicles that can be managed by the service entity (e.g., its backend system clients) to provide one or more vehicle services. An autonomous vehicle utilized to provide the vehicle service(s) can be included in this fleet of the service entity. Such autonomous vehicle may be referred to as "service entity autonomous vehicles" or "first party autonomous vehicles." In some implementations, an autonomous vehicle can be associated with a third party vehicle provider such as, for example, an individual, an original equipment manufacturer (OEM), a third party vendor, or another entity. These autonomous vehicles may be referred to as "third party autonomous vehicles." Even though such an autonomous vehicle may not be included in the fleet of autonomous vehicles of the service entity, the service platform can allow the autonomous vehicle(s) associated with a third party to still be utilized to provide the vehicle services offered by the service entity, access the service entity's system back-ends systems, etc.

Each autonomous vehicle that is online with the service entity can be associated with an itinerary. The itinerary can be a data structure (e.g., a list, table, tree, queue, etc.) that is stored and accessible via a backend service of the service platform (e.g., an itinerary service, etc.). The itinerary can include a sequence of tasks for the autonomous vehicle. For example, for a given autonomous vehicle, the itinerary can include tasks such as, for example: a first vehicle service assignment (e.g., to transport a user/item from one location to another), a re-positioning task (e.g., for the vehicle to deadhead from one geographic area to another), a data acquisition task (e.g., to acquire sensor data of an unmapped/changed travel way, obstruction, etc.), an assistance task (e.g., to assist another autonomous vehicle), a refueling task (as further described herein), and/or other tasks. The task(s) can be stored in a particular sequence for allocation to the autonomous vehicle. Additionally, or alternatively, each task can be assigned a priority or weight indicating the priority with which that task should be given with respect to other tasks. For example, the priority associated with a vehicle service assignment may be higher than the priority associated with a data acquisition task. In some implementations, higher priority tasks can interrupt lower priority tasks such that an autonomous vehicle will cease the performance of the lower priority task in the event it receives (and accepts) a higher priority task. An interrupted task can be cancelled. In some implementations, the interrupted task can remain or be returned back into the vehicle's itinerary. In some implementations, the interrupted task may be removed or not returned back into the vehicle's itinerary.

As the first party or third party autonomous vehicles are providing vehicle services, the energy levels of the vehicles will dissipate over time. However, if the autonomous vehicles are constantly refueling, the vehicles may become unavailable to provide vehicle services at a time when the autonomous vehicle is needed. Additionally, in such a scenario, autonomous vehicles may utilize their onboard resources (e.g., memory, processing, etc.) for traveling to service depots rather than transporting users, leading to inefficient resource usage. Thus, it is important for the operations computing system to determine when and how the autonomous vehicles should undertake refueling to maintain a sufficient supply of autonomous vehicles for vehicle services and to avoid inefficient use of vehicle resources.

To help determine appropriate autonomous vehicle refueling, the operations computing system can obtain data indicative of one or more vehicle conditions associated with an autonomous vehicle. For example, the operations computing system can obtain data indicative of one or more energy parameters associated with an autonomous vehicle. The energy parameters can be indicative of a past, current, and/or future: energy level (e.g., gas level, charge level, etc.), an energy capacity (e.g., gasoline capacity, charge capacity, etc.), energy efficiency (e.g., distance per gallon of gasoline, distance/time per amount of charge, etc.), and/or other energy related vehicle characteristics. The energy parameters can be specific to the individual autonomous vehicle, the type of autonomous vehicle, and/or a fleet to which the autonomous vehicle belongs. In some implementations, the operations computing system can obtain data indicative of the route and/or geographic area in which the autonomous has, is, or will be traveling. In some implementations, the operations computing system can obtain data indicative of the past, current, or future projected volume/demand for vehicle services and/or the supply of vehicles to perform those vehicle services. For example, the operations computing system can determine that during a typical commute time in a geographic area there may be a high demand for vehicle services. The operations computing system can determine the available vehicle supply for that demand and determine whether an autonomous vehicle may experience a high volume of vehicle service assignments based at least in part on that demand and supply.

The operations computing system can also, or alternatively, obtain data indicative of one or more operational capabilities of an autonomous vehicle. The operational capabilities can describe the autonomy capabilities of the autonomous vehicle, the restrictions of an autonomous vehicle, scenes, scenarios, types of areas, and/or specific geographic areas in which the autonomous vehicle can operate, and/or other information descriptive of how an autonomous vehicle can or cannot autonomously operate. For example, the operational capabilities can indicate whether an autonomous vehicle can perform a U-turn and/or whether the autonomous vehicle is restricted from performing an unprotected left turn. In another example, the operational capabilities can indicate that an autonomous vehicle is capable of operating in a high traffic area (e.g., an urban setting, etc.) and/or the geographic fences/boundaries for where the autonomous vehicle can travel (e.g., based on the map data available to the autonomous vehicle, vehicle provider preferences, etc.).

The data indicative of the vehicle condition(s) (e.g., energy parameter(s), vehicle service volume/supply information, operational capability data, etc.) can be obtained from the autonomous vehicle and/or via another computing system. For example, the service platform of the operations computing system can allow a first party autonomous vehicle of the service entity (or a third party autonomous vehicle) to communicate data indicative of the vehicle's energy parameters to the operations computing system. Additionally, or alternatively, the service platform can allow a computing system associated with a third party vehicle provider (e.g. that puts at least a portion of its fleet online with the service entity) to communicate data indicative of energy parameters, operational capabilities, etc. to the operations computing system. The vehicle conditions for an autonomous vehicle (and/or an associated fleet) can be stored and/or otherwise accessible by the operations computing system (e.g., within a profile for the autonomous vehicle and/or fleet, etc.).

The operations computing system can determine a refueling task for the autonomous vehicle based at least in part on the energy parameters and/or other condition(s) associated with the autonomous vehicle. The refueling task can include instructions requesting (or commanding) that the autonomous vehicle travel to a location to replenish the vehicle's onboard energy resources. This can include the replenishment of combustible fuel (e.g., gasoline), electric charge (e.g., for onboard batteries, etc.), and/or other types of energy. In some implementations, the refueling task can include data indicative of a location of a service depot that is suitable for the autonomous vehicle to replenish the vehicle's onboard energy supply (e.g., a service depot that has the infrastructure and type of energy needed for the autonomous vehicle). In some implementations, the refueling task can include a route for the autonomous vehicle to follow to arrive at the service depot. In some implementations, the refueling task may not indicate a location of a service depot and/or a route. The autonomous vehicle and/or another computing system (e.g., of a third party vehicle partner) can determine an appropriate location for energy replenishment and/or a route thereto based, for example, on map data, traffic data, etc.

The operations computing system can select different types of refueling tasks for an autonomous vehicle. For example, the operations computing system can select a first refueling task that is interruptible by another vehicle task. The first refueling task can be referred to as a "soft" refueling task. The first refueling task can be interruptible in that the autonomous vehicle (and/or another computing system) can pause, cancel, hold, etc. the performance of the first refueling task in the event that the autonomous vehicle is allocated another vehicle task such as, for example, a vehicle service assignment (e.g., to transport a user/item, etc.). In some implementations, the refueling task can be a second refueling task that is uninterruptible by another vehicle task. The second refueling task can be referred to as a "hard" refueling task. The second refueling task can be uninterruptible in that the autonomous vehicle (and/or another computing system) will not pause, cancel, hold, etc. the performance of the second refueling task in the event that the autonomous vehicle is allocated another vehicle task such as, for example, a vehicle service assignment.

Each type of refueling task can be associated with a threshold. For example, the first refueling task can be associated with a first energy threshold. The first energy threshold can be indicative of a vehicle energy level at which it would be preferable, desirable, etc. to replenish the vehicle's energy supply. However, the first energy threshold can be a soft threshold at which the autonomous vehicle is not required to replenish its onboard energy supply. By way of example, the first energy threshold can be 50% of the vehicle's energy capacity. The second refueling task can be associated with a second energy threshold. The second energy threshold can be indicative of a vehicle energy level at which the autonomous vehicle is required to replenish the vehicle's onboard energy supply. By way of example, the second energy threshold can be 25% of the vehicle's energy capacity. Thus, the first energy threshold can be greater than the second energy threshold (which indicates a lower energy level).

The energy thresholds can be based on a variety of factors. For example, the first and/or second energy threshold can be based at least in part on the operational capabilities of the autonomous vehicle and/or its associated fleet. By way of example, an autonomous vehicle with higher energy efficiency may have lower energy thresholds associated with the refueling tasks because the autonomous vehicle can travel further on a lower level of energy. In another example, an autonomous vehicle that has less restrictions on its autonomous navigability/maneuverability may have lower energy thresholds for the refueling tasks. For instance, a first autonomous vehicle (e.g., associated with a first fleet of a first vehicle provider) may be able to perform U-turns and unprotected left turns. A second autonomous vehicle (e.g., associated with a second fleet of a second vehicle provider) may not be able to perform U-turns and unprotected left turns. The refueling task energy thresholds for the first autonomous vehicle (and/or the first fleet) can be lower than the refueling task energy thresholds for the second autonomous vehicle because the first autonomous vehicle may be able to travel along a more efficient route to a service depot for energy replenishment. The refueling task energy thresholds may be higher for the second autonomous vehicle (and/or the second fleet) to account for any inefficiencies in the second autonomous vehicle's travels due to its operational capabilities (e.g., restrictions on autonomy capability).

In some implementations, the refueling task energy thresholds can be based at least in part on a third party vehicle provider. For instance, the service entity and a vehicle provider may determine what the first and/or second energy threshold should be for a given autonomous vehicle and/or the fleet of the vehicle provider. This can allow the vehicle provider to provide explicit input into refueling tasks and the circumstances in which they may be triggered.

Each refueling task can be associated with a priority. For instance, as described herein, an autonomous vehicle can be associated with an itinerary that includes a plurality of tasks for the autonomous vehicle. Each task in the itinerary can include a priority. The priority can indicate an importance/urgency of the task and inform an autonomous vehicle (and/or another computing system) which task should be performed by the autonomous vehicle among the plurality of tasks. By way of example, as described herein, a first refueling task (e.g., the "soft" refueling task) can interruptible by another vehicle task such as a vehicle service assignment. The vehicle service assignment can be associated with a higher priority than the first refueling task. As described herein, the second refueling task (e.g., the "hard" refueling task) can be uninterruptible by another vehicle task. As such, the second refueling task can be associated with a higher priority than the other vehicle tasks (e.g., a vehicle service assignment, re-positioning task, assistance task, etc.).

The operations computing system can determine a refueling task for an autonomous vehicle based at least in part on the energy threshold(s) and/or priorities. For instance, in the event that energy level of the autonomous vehicle is below the first energy threshold but above the second energy threshold, the operations computing system can determine that the autonomous vehicle should perform the first refueling task (e.g., the "soft" refueling task). This can allow the autonomous vehicle to still be assigned another task in the event a higher priority task is appropriate. For example, the autonomous vehicle can still be available to perform a vehicle service assignment in the event the autonomous vehicle is matched with a service request. In the event that the energy level of the autonomous vehicle is below the second energy threshold, the operations computing system can determine that the autonomous vehicle should perform the second refueling task (e.g., the "hard" refueling task). If accepted, the autonomous vehicle can become unavailable to perform another vehicle task (e.g., a vehicle service assignment). As further described herein, the autonomous vehicle may be unavailable until the vehicle's energy level reaches a certain level (e.g., above the second energy threshold, first energy threshold, etc.).

In some implementations, the operations computing system can select different types of refueling tasks for an autonomous vehicle based at least in part on a vehicle service assignment. For example, the operations computing system can determine the route, destination, traffic level, travel distance, travel time, etc. associated with transporting a user associated with a service request. The operations computing system can determine whether the energy level of the autonomous vehicle will fall below (e.g., at a future time) the first and/or second thresholds while or after transporting the user based at least in part on the vehicle's energy parameters, route, operational capabilities, etc. In the event that the operations computing system predicts that the vehicle's energy level will fall below the first energy threshold (e.g., at a future time), the operations computing system can determine that the autonomous vehicle should be allocated a first refueling task. In the event that the operations computing system predicts that the vehicle's energy level will fall below (e.g., at a future time) the second energy threshold, the operations computing system can determine that the autonomous vehicle should be allocated a second refueling task. The operations computing system can include the first and/or second refueling tasks to an itinerary associated with the autonomous vehicle.

In some implementations, the operations computing system can determine a refueling task for an autonomous vehicle based at least in part on a destination associated with a vehicle task to be performed by the autonomous vehicle. For example, the autonomous vehicle may be performing or is to perform a re-positioning task, vehicle service assignment, etc. that will result in the autonomous vehicle being located proximate (e.g., within 1-10 blocks, within 1 mile, etc.) a service depot that is suitable for the autonomous vehicle to replenish its energy level. The energy level of the autonomous vehicle may (or may not) fall below the first or second energy threshold due to the performance of this vehicle task. In either case, the operations computing system can determine that it would be efficient for the autonomous vehicle to replenish its energy level at the service depot. Accordingly, the operations computing system can select a first or second refueling task for the autonomous vehicle such that the autonomous vehicle is instructed to travel to replenish its energy supply at the nearby service depot.

In some implementations, the operations computing system can select different types of refueling tasks for an autonomous vehicle based at least in part on the operational capabilities of the autonomous vehicle. For instance, the operations computing system can obtain data indicative of one or more operational capabilities of a first autonomous vehicle. The operational capabilities can indicate that the first autonomous vehicle can autonomously perform a U-turn maneuver and an unprotected left turn maneuver. The operations computing system can obtain data indicative of one or more operational capabilities of a second autonomous vehicle. The operational capabilities can indicate that the second autonomous vehicle cannot autonomously perform a U-turn maneuver or an unprotected left turn maneuver. Based at least in part on the operational capabilities, the operations computing system can determine that the first autonomous vehicle should be allocated a first refueling task (e.g., a "soft" refueling task) because the first autonomous vehicle is likely to be able to take more efficient vehicle routes and, thus, perform other vehicle tasks without its energy level falling below the second threshold (e.g., for a "hard" refueling task). Additionally, or alternatively, the operations computing system can determine that the second autonomous vehicle should be allocated a second refueling task (e.g., a "hard" refueling task) because the second autonomous vehicle is likely to be able to take less efficient vehicle routes given the restrictions on its autonomy capability and, thus, is more likely to fall below the second threshold (e.g., for a "hard" refueling task) if assigned another vehicle task.

In some implementations, the operations computing system can determine the refueling task for an autonomous vehicle based at least in part on one or more other vehicle conditions. For example, the operations computing system can obtain data indicative of the past, present, and/or future (predicted) volume/demand for vehicle services and/or other vehicle tasks (e.g., within a geographic area). The operations computing system can also, or alternatively, obtain data indicative of the past, present, and/or future (predicted) supply of vehicles that are online with the service entity and available to perform those vehicle services. The operations computing system (and/or another computing system) can determine whether it would be more valuable for an autonomous vehicle to be available to perform requested vehicle services and/or another task than perform a refueling task. For example, in the event that it would be beneficial for the vehicle to be available to perform vehicle service assignments (e.g., to help maintain sufficient supply, to avoid inefficient vehicle resource usage, to increase revenue, etc.), the operations computing system can determine that the first refueling task (e.g., the "soft" refueling task) would be more appropriate for the autonomous vehicle so that the vehicle can be interrupted to perform a vehicle service assignment, if needed.

The operations computing system can communicate data indicative of the refueling task to the autonomous vehicle or to a computing system associated with the autonomous vehicle (that is remote from the autonomous vehicle). The computing system associated with the autonomous vehicle can be a computing system that manages the autonomous vehicle. This can include, for example, a computing system of a third party vehicle provider that manages the autonomous vehicle for providing vehicle service(s)/performing task(s) associated with the service entity (e.g., by communicating data to/from the vehicle, etc.). In some implementations, the data indicative of the refueling task can be communicated with data indicative of another vehicle task (e.g., a vehicle service assignment) so that the autonomous vehicle can undertake the refueling task before and/or after the performance of the other vehicle task. For example, a second refueling task (e.g., a "hard" refueling task) can be communicated with a re-positioning task so that the autonomous vehicle replenishes its energy level before repositioning. In another example, a first refueling task (e.g., a "soft" refueling task) can be communicated with a vehicle service assignment so that the autonomous vehicle travels to replenish its energy level after dropping-off a user/item. In some implementations, the data indicative of the refueling task can be communicated separately from data indicative of another task. This can include communicating the data indicative of the refueling task before, during, and/or after the autonomous vehicle performs another vehicle task (e.g., a vehicle service assignment, re-positioning task, etc.).

In some implementations, the operations computing system can communicate the data indicative of the refueling task based at least in part on the type of autonomous vehicle. For instance, the operations computing system can communicate the data indicative of the refueling task to a first party autonomous vehicle. The data indicative of the refueling task can indicate the type of refueling task (e.g., first refueling task, second refueling task, etc.), a priority, a location of a service depot, a route to a service depot, and/or other types of information. The first party autonomous vehicle can determine whether or not to accept or reject the refueling task. For example, the first party autonomous vehicle may be configured to accept the refueling task unless it is physically unable to perform the refueling task (e.g., due to a vehicle defect). Additionally, or alternatively, the operations computing system can communicate the data indicative of the refueling task to a remote computing system (e.g., of a third party vehicle provider) for a third party autonomous vehicle. The remote computing system can determine whether to accept or reject the refueling task for the third party autonomous vehicle and/or communicate the refueling task to the third party autonomous vehicle, which can make such a determination. For example, the remote computing system may reject the refueling task in the event the vehicle provider determines that it would rather the autonomous vehicle perform or be available for another vehicle task (e.g., a vehicle service assignment).

The operations computing system can determine whether the refueling task for the autonomous vehicle has been accepted or rejected. In some implementations, the operations computing system can obtain data indicative of an acceptance or rejection of the refueling task from an autonomous vehicle and/or another computing system. In some implementations, the operations computing system can monitor the autonomous vehicle (e.g., its location, motion, intended route, etc.) and deduce whether the refueling task has been accepted or rejected. For example, in the event that the operations computing system determines that the autonomous vehicle is travelling along a route to arrive at a service depot that is appropriate for the vehicle's energy replenishment, the operations computing system can determine that the refueling task has been accepted. In another example, in the event that the operations computing system determines that the autonomous vehicle is travelling along a route to reposition itself to another geographic area (not proximate a service depot), the operations computing system can determine that the refueling task has been rejected.

The operations computing system can determine at least a portion of an itinerary associated with an autonomous vehicle based at least in part on an acceptance or rejection of the refueling task. For instance, in the event that the refueling task is accepted the refueling task can be maintained in the vehicle's itinerary or placed into the vehicle's itinerary if it has not already been included in the itinerary. In another example, in the event that the refueling task is rejected the operations computing system may not include the refueling task in the vehicle's itinerary, may remove the refueling task from the vehicle's itinerary, and/or deprioritize the refueling task in the vehicle's itinerary (e.g., by lowering the associated priority).

The operations computing system can determine whether an autonomous vehicle performing a refueling task should be selected for a vehicle service. For instance, the operations computing system can obtain data indicative of a service request for a vehicle service. This can include, for example, a request to transport a user from an origin location to a destination location. The operations computing system can determine whether to select the autonomous vehicle for the service request based at least in part on the refueling task. For example, the operations computing system can select an autonomous vehicle for the service request when the autonomous vehicle has accepted a first refueling task (e.g., an interruptible "soft" refueling task). In response, the operations computing system can generate a vehicle service assignment based at least in part on the service request. The vehicle service assignment can indicate the user's origin, requested destination, and/or other service conditions. The vehicle service assignment can also be associated with a higher priority than the first refueling task. The operations computing system can communicate data indicative of the vehicle service assignment for the autonomous vehicle to the vehicle itself, another computing system, etc. In the event the vehicle service assignment is accepted (e.g., by the vehicle, a third part computing system, etc.), the refueling task can be cancelled. In some implementations, the operations computing system can re-communicate the data indicative of the refueling task for the autonomous vehicle after or near completion of the vehicle service assignment by the autonomous vehicle.

In the event an autonomous vehicle is performing a second refueling task (e.g., an uninterruptible "hard" refueling task), the operations computing system may have several options for proceeding with respect to a service request. In some implementations, the operations computing system can determine not to select the autonomous vehicle for the service request when the autonomous vehicle has accepted a second refueling task. In some implementations, the operations computing system can determine whether a vehicle service assignment associated with the service request can be forward dispatched to an autonomous vehicle performing the second refueling task. For example, an autonomous vehicle can be performing the second refueling task by travelling to a service depot and replenishing its energy supply (e.g., obtaining more gasoline, re-charging its batteries, etc.). The operations computing system can obtain updated energy parameters for the autonomous vehicle. The updated energy parameters can include an updated energy level for the autonomous vehicle. The operations computing system can determine that the updated energy level of the autonomous vehicle is above (or nearing) a threshold (e.g., the first or second energy threshold). Thus, the autonomous vehicle may soon be available again to perform vehicle service assignments. In some implementations, when the updated energy level becomes above the second energy threshold (e.g., associated with "hard" refueling task), the operations computing system can indicate the autonomous vehicle as now performing a first refueling task that is interruptible by another vehicle task. Accordingly, the operations computing system can select the autonomous vehicle for a service request based at least in part on the updated energy level, even though the vehicle is performing a second refueling task because the time to completion of the second refueling is small enough that the vehicle service assignment can be sufficiently performed.

In some implementations, the operation computing system can configure its allocation of refueling tasks based at least in part on feedback from autonomous vehicles and/or third party vehicle providers. For example, the operations computing system can obtain feedback data indicative of previous acceptance(s) or rejection(s) of previous refueling task(s). The feedback data can be associated with, for example, a third party vehicle provider that has placed at least a portion of its autonomous vehicle fleet online with the service entity. Based on the feedback data, the operations computing system can adjust its analysis for determining refueling tasks for the third party vehicles of that third party vehicle provider. For instance, a first threshold associated with a first refueling task or a second threshold associated with a second refueling task can be adjusted based at least in part on the feedback data. By way of example, in the event that the third party vehicle provider is rejecting first refueling tasks (e.g., "soft" refueling tasks), the first threshold for triggering such a refueling task can be lowered such that the energy level of the autonomous vehicle should be lower in order to trigger the assignment of such a refueling task.

The systems and methods described herein provide a number of technical effects and benefits. In the event that an autonomous vehicle is too often travelling for energy replenishment, its onboard computing resources may be used inefficiently. For example, the autonomous vehicle may utilize its processing and memory resources gathering sensor data while it is deadheading to a service depot (without performing a vehicle service). To help avoid the wasteful usage of the vehicle's limited computational resources, the systems and methods of the present disclosure provide improved techniques for efficiently replenishing the onboard energy resources of an autonomous vehicle. To do so, aspects of the present disclosure allow a computing system to selectively determine refueling tasks for autonomous vehicle(s) to perform at an appropriate time/energy level given the state of the vehicle, its environment, and the services it performs. This can help optimize the frequency and timing with which an autonomous vehicle travels for energy replenishment and minimizes the potential waste of the vehicles' computational resources. Ultimately, the technology of the present disclosure can lead to improved opportunities for vehicle service assignments and/or other tasks.

Example aspects of the present disclosure can provide an improvement to vehicle computing technology, such as autonomous vehicle computing technology. For instance, the systems and methods of the present disclosure provide an improved approach to efficiently replenishing the onboard energy resources of an autonomous vehicle. For example, a computing system (e.g., an operations computing system that is remote from the autonomous vehicle) can obtain one or more energy parameters and/or other conditions associated with an autonomous vehicle. The computing system can determine a refueling task for the autonomous vehicle based at least in part on the energy parameters (and/or other conditions) associated with the autonomous vehicle. As described herein, the refueling task can include either a first refueling task that is interruptible by another vehicle task or a second refueling task that is not interruptible by the other vehicle task. The operations computing system can communicate data indicative of the refueling task to the autonomous vehicle or to a computing system associated with the autonomous vehicle and determine whether the refueling task for the autonomous vehicle has been accepted or rejected. In this way, a computing system can determine the most appropriate approach for autonomous vehicle energy replenishment based on the circumstances of that autonomous vehicle, its associated fleet for an autonomous vehicle, and/or the preferences of its associated vehicle provider. Moreover, the computing system can strategically determine which refueling tasks to assign to an autonomous vehicle based on a prioritization of the tasks and their fit to the autonomous vehicle. This leads to a more productive use of a vehicle's resources, while reducing the opportunity for the autonomous vehicle to unnecessarily travel for energy replenishment when another task may be more beneficial. Ultimately, the computing system can decrease wasteful usage of the computational resources for idle autonomous vehicles.

With reference to the figures, example embodiments of the present disclosure will be discussed in further detail. FIG. 1 depicts a block diagram of an example system 100 for controlling the navigation of an autonomous vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140. The vehicle 102 can be an autonomous vehicle.

The operations computing system 104 can be associated with a service entity that can provide one or more vehicle services to a plurality of users via a fleet of vehicles that includes, for example, the vehicle 102. The vehicle services can include transportation services (e.g., rideshare services), courier services, delivery services, and/or other types of services. The operations computing system 104 can be remote from the vehicle 102.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with the service entity, the operation of one or more vehicles (e.g., a fleet of vehicles), with supporting the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108. In some implementations, the one or more remote computing device(s) 106 can be associated with a third party such as, for example, a third party vehicle vendor with a fleet of third party vehicles. The remote computing device(s) 106 can implement the computing system of the third party (e.g., for communication/coordination/operation of third party autonomous vehicles).

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to communicate data to and/or obtain data from a vehicle, and determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, light electric vehicle, bicycle, scooter, etc.), an aircraft, and/or another type of vehicle (e.g., watercraft, etc.). The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those of the vehicle described herein.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The sensor data 116 can be indicative of locations associated with the one or more objects within the surrounding environment of the vehicle 102 at one or more times. For example, the sensor data 116 can be indicative of one or more LIDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device(s) 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. The perception system 124, prediction system 126, and/or motion planning system can be separate systems or included within the same system. The autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on sensor data 116 received from the sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a representation of the environment around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory made of waypoints) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the system on-board the vehicle 102.

The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat).

Figure 2:
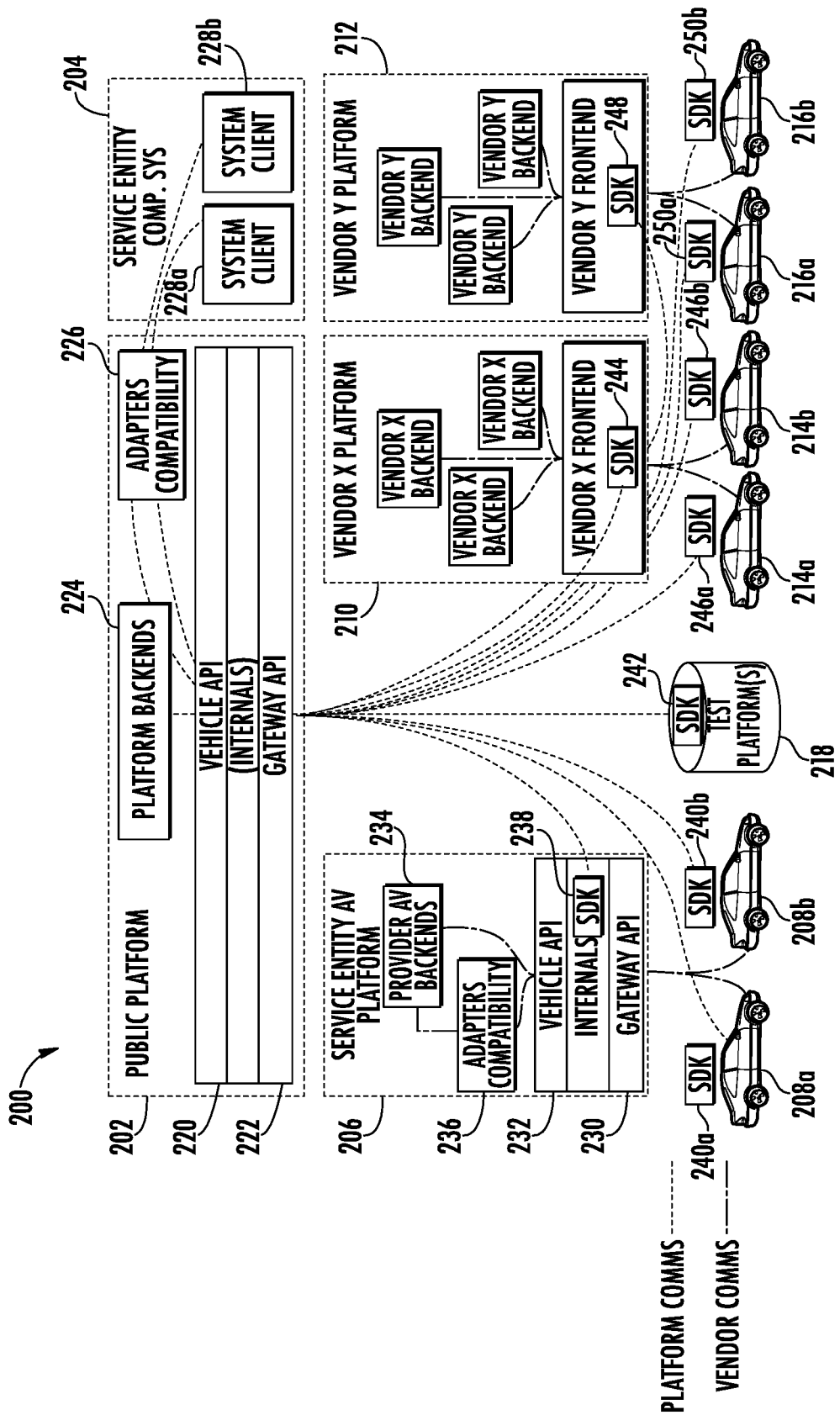
FIG. 2 depicts an example infrastructure system according to example embodiments of the present disclosure.

FIG. 2 depicts an example service infrastructure 200 according to example embodiments of the present disclosure. As described below, the service infrastructure 200 can include one or more components that are included in a service entity computing system for coordinating the type of vehicle deployment and control of the present disclosure.

As illustrated in FIG. 2, an example service infrastructure 200, according to example embodiments of the present disclosure, can include an application programming interface platform (e.g., public platform) 202, a service entity computing system 204, a service entity autonomous vehicle platform (e.g., private platform) 206, one or more service entity autonomous vehicles (e.g., first party autonomous vehicles in a service entity fleet) such as autonomous vehicles 208a and 208b, and one or more test platforms 218. For example, the service entity may own, lease, etc. a fleet of autonomous vehicles that can be managed by the service entity (e.g., its backend system clients) to provide one or more vehicle services. The autonomous vehicle(s) 208a, 208b utilized to provide the vehicle service(s) can be included in this fleet of the service entity. Such autonomous vehicle may be referred to as "service entity autonomous vehicles" or "first party autonomous vehicles." Additionally, the service infrastructure 200 can also be associated with and/or in communication with one or more third-party entity systems such as vendor platforms 210 and 212, and/or one or more third-party entity autonomous vehicles (e.g., in a third-party entity autonomous vehicle fleet) such as autonomous vehicles 214a, 214b, 216a, and 216b. For instance, the autonomous vehicle 214a, 214b, 216a, and 216b can be associated with a third party vehicle provider such as, for example, an individual, an original equipment manufacturer (OEM), a third party vendor, or another entity. These autonomous vehicles may be referred to as "third party autonomous vehicles." Even though such an autonomous vehicle 214a, 214b, 216a, and 216b may not be included in the fleet of autonomous vehicles of the service entity, the service entity infrastructure 200 can include a platform that can allow the autonomous vehicle(s) 214a, 214b, 216a, and 216b associated with a third party to still be utilized to provide the vehicle services offered by the service entity, access the service entity's system clients, and/or the like.

In some implementations, the technology described herein can include one or more of the platforms and related components illustrated in the service infrastructure 200 of FIG. 2. As described herein, a service infrastructure 200 can include a public platform 202 to facilitate vehicle services (e.g., provided via one or more system clients (228a, 228b) associated with a service entity operations computing system) between the service entity computing system 204 (e.g., operations computing system, etc.) and vehicles associated with one or more entities (e.g., vehicles associated with the service entity (208a, 208b), vehicles associated with third-party entities (214a, 214b, 216a, 216b), etc.). For example, in some embodiments, the public platform 202 can provide access to services (e.g., associated with the service provider system 204) such as trip assignment services, routing services, supply positioning services, payment services, and/or the like.

The public platform 202 can include a gateway API (e.g., gateway API 222) to facilitate communication from the autonomous vehicles to the service entity infrastructure services (e.g., system clients 228a, 228b, etc.) and a vehicle API (e.g., vehicle API 220) to facilitate communication from the service entity infrastructure services (e.g., system clients 228a, 228b, etc.) to the vehicles (e.g., 208a, 208b, 214a, 214b, 216a, 216b). For example, the public platform 202, using the vehicle API 220, can query the vehicles (e.g., 208a, 208b, 214a, 214b, 216a, 216b) and/or third party systems/platforms to determine an availability (e.g., to accept a vehicle service assignment, vehicle operational capability, etc. The vehicles and/or other systems can transmit data (e.g., availability data, operational capability data, etc.) to the public platform 202 using the gateway API 222.

In some embodiments, the public platform 202 can be a logical construct that contains all vehicle and/or service facing interfaces. The public platform 202 can include a plurality of backend services interfaces (e.g., public platform backend interfaces 224). Each backend interface 224 can be associated with at least one system client (e.g., service provider system 204 clients such as system clients 228a and 228b). A system client (e.g., 228a, 228b, etc.) can be the hardware and/or software implemented on a computing system (e.g., operations computing system of the service entity) that is remote from the vehicle and that provides a particular back-end service to a vehicle (e.g., scheduling of vehicle service assignments, routing services, payment services, user services, vehicle rating services, etc.). A backend interface 224 can be the interface (e.g., a normalized interface) that allows one application and/or system (e.g., of the autonomous vehicle) to provide data to and/or obtain data from another application and/or system (e.g., a system client). Each backend interface 224 can have one or more functions that are associated with the particular backend interface. A vehicle can provide a communication to the public platform 202 to call a function of a backend interface. In this way, the backend interface(s) 224 can be an external facing edge of the service entity infrastructure system 204 that is responsible for providing a secure tunnel for a vehicle and/or other system to communicate with a particular service provider system client (e.g., 228a, 228b, etc.) so that the vehicle and/or other system can utilize the backend service associated with that particular service entity system client (e.g., 228a, 228b, etc.), and vice versa.

In some embodiments, the public platform 202 can include one or more adapters 226, for example, to provide compatibility between one or more backend interfaces 224 and one or more service entity system clients (e.g., 228a, 228b, etc.). In some embodiments, the adapter(s) 226 can provide upstream and/or downstream separation between the service entity operations computing system 204 (e.g., system clients 228a, 228b, etc.) and the public platform 202 (e.g., backend interfaces 224, etc.). In some embodiments, the adapter(s) 226 can provide or assist with data curation from upstream services (e.g., system clients), flow normalization and/or consolidation, extensity, and/or the like.

The service infrastructure 200 can include a private platform 206 to facilitate service provider-specific (e.g., internal, proprietary, etc.) vehicle services (e.g., provided via one or more system clients (228a, 228b) associated with the service entity operations computing system) between the service entity infrastructure system 204 (e.g., operations computing system, etc.) and vehicles associated with the service entity (e.g., vehicles 208a, 208b). For example, in some embodiments, the private platform 206 can provide access to service entity services that are specific to the service entity vehicle fleet (e.g., first party autonomous vehicles 208a and 208b) such as fleet management services, autonomy assistance services, and/or the like.

The private platform 206 can include a gateway API (e.g., gateway API 230) to facilitate communication from the vehicles 208a, 208b to one or more service entity infrastructure services (e.g., via the public platform 202, via one or more service entity autonomous vehicle backend interfaces 234, etc.) and a vehicle API (e.g., vehicle API 232) to facilitate communication from the service entity infrastructure services (e.g., via the public platform 202, via one or more service provider vehicle backend interfaces 234, etc.) to the vehicles 208a, 208b. The private platform 206 can include one or more backend interfaces 234 associated with at least one system client (e.g., service provider vehicle-specific system clients, such as fleet management, autonomy assistance, etc.). In some embodiments, the private platform 206 can include one or more adapters 236, for example, to provide compatibility between one or more service entity vehicle backend interfaces 234 and one or more private platform APIs (e.g., vehicle API 232, gateway API 230).

In some embodiments, the service infrastructure 200 can include a test platform 218 for validating and vetting end-to-end platform functionality, without use of a real vehicle on the ground. For example, the test platform 218 can simulate trips with human drivers and/or support fully simulated trip assignment and/or trip workflow capabilities.

The service infrastructure 200 can be associated with and/or in communication with one or more third-party entity systems, such as third-party entity (e.g., Vendor X) platform 210 and third-party entity (e.g., Vendor Y) platform 212, and/or one or more third-party entity vehicles (e.g., in a third-party entity vehicle fleet) such as third-party vehicles 214a, 214, 216a, and 216b. The third-party entity platforms 210, 212 can be distinct and remote from the service provide infrastructure and provide for management of vehicles associated with a third-party entity fleet, such as third-party entity (e.g., Vendor X) vehicles 214a, 214b and third-party entity (e.g., Vendor Y) vehicles 216a, 216b. The third-party entity (e.g., Vendor X) platform 210 and third-party entity (e.g., Vendor Y) platform 212, and/or third-party entity (e.g., Vendor X) vehicles 214a, 214b and third-party entity (e.g., Vendor Y) vehicles 216a, 216b can communicate with the service entity operations computing system 204 (e.g., system clients, etc.) via the public platform 202 to allow the third-party entity platforms and/or vehicles to access one or more service entity infrastructure services (e.g., trip services, routing services, payment services, user services, etc.).

The service infrastructure 200 can include a plurality of software development kits (SDKs) (e.g., set of tools and core libraries), such as SDKs 238, 240a, 240b, 242, 244, 246a, 246b, 248, 250a, and 250b, that provide access to the public/private platforms 202, 204 for use by both the service provider autonomous vehicles (208a, 208b) and the third-party entity vehicles (214a, 214b, 216a, 216b). In some implementations, all external communication with the platforms can be done via the SDKs. For example, the provider entity infrastructure can include both a public SDK and a private SDK and specific endpoints to facilitate communication with the public platform 202 and the private platform 206, respectively. In some embodiments, the service entity vehicle fleet (e.g., vehicle 208a, 208b) and/or test platform 218 can use both the public SDK and the private SDK, whereas the third-party entity autonomous vehicles (vehicle 214a, 214b, 216a, 216b) can use only the public SDK and associated endpoints. In some implementations, the SDKs can provide a single entry point into the service entity infrastructure (e.g., public platform 202, etc.), which can improve consistency across both the service provider fleet and the third-party entity fleet(s). As an example, a public SDK can provide secured access to the public platform 202 by both service entity vehicles and third-party entity (and/or systems) and access to capabilities such as trip assignment, routing, onboarding new vehicles, supply positioning, monitoring and statistics, a platform sandbox (e.g., for integration and testing), and/or the like. The private SDK can be accessed by the service entity vehicles and provide access to capabilities such as remote assistance, vehicle management, operational data access, fleet management, and/or the like.

In some embodiments, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service entity's services. For example, based on the authentication certificate, a command-line interface can determine which version of the SDK (e.g., public or private) to which to provide access.

Figure 3:
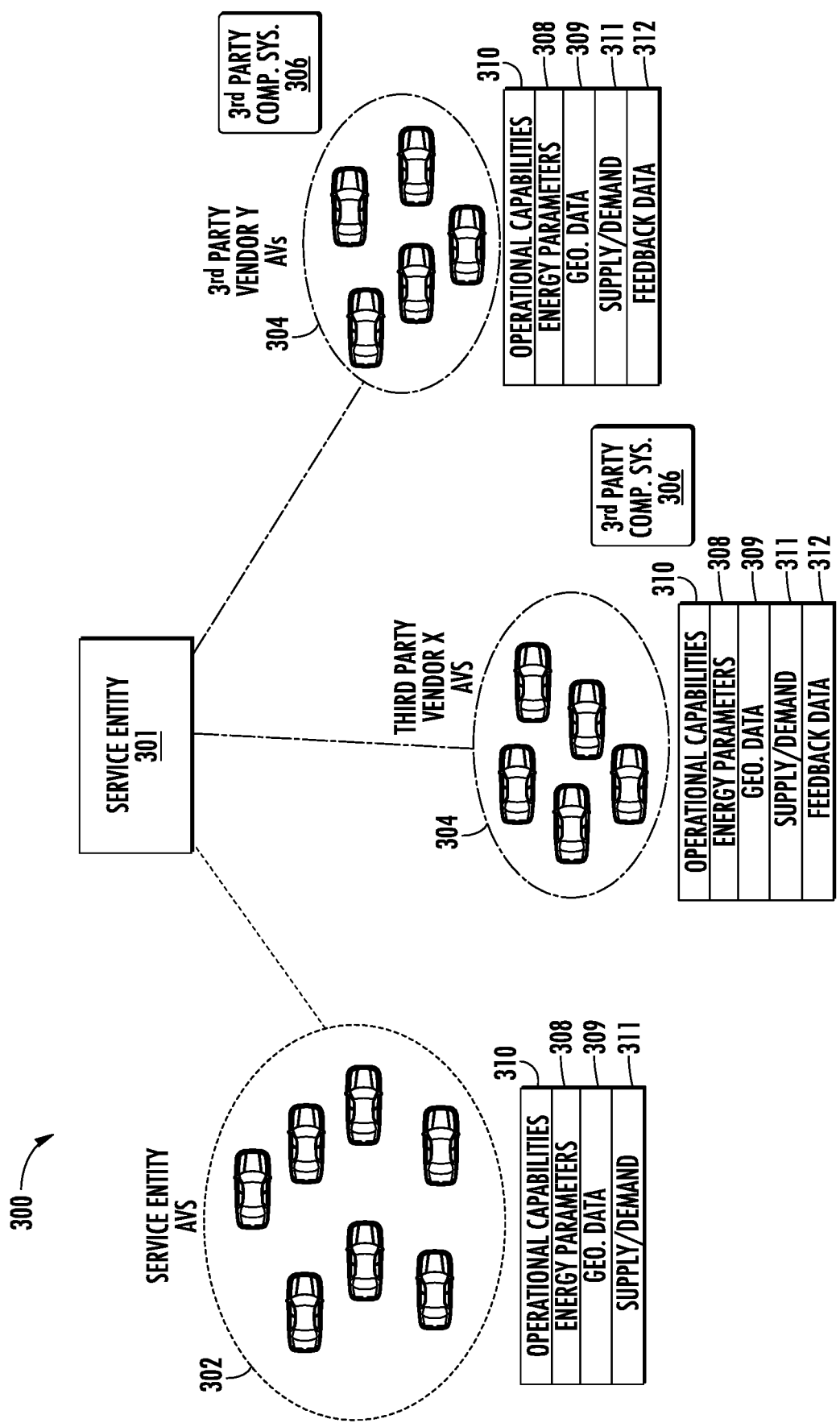
FIG. 3 depicts example of vehicle providers according to example embodiments of the present disclosure.

FIG. 3 depicts an example ecosystem 300 of vehicles according to example embodiments of the present disclosure. The service entity 301 can utilize a plurality of autonomous vehicles including, but not limited to, service entity/first party autonomous vehicles 302 and/or third party autonomous vehicles 304 (e.g., third party vendor X autonomous vehicle, third party vendor Y autonomous vehicles, etc.). The service entity 301 can be associated with a first computing system such as, for example, the service entity computing system 204. The first party autonomous vehicles 302 can be configured to directly and/or indirectly communicate with the service entity computing system 204 of the service entity 301. Each vehicle provider (e.g., vendor X, vendor Y) can be associated with a respective second computing system such as, for example, a third party computing system 306. The third party computing system 306 can be configured to manage the third party autonomous vehicles 304 (of the associated fleet). The third party computing system 306 can manage the vehicle service assignments, other vehicle tasks, dispatch, maintenance, online/offline status, etc. of its associated third party autonomous vehicles 304. Each third party autonomous vehicle (or fleet of third party autonomous vehicles) can communicate with the service entity computing system 204 directly and/or indirectly via a respective third party computing system 306.

The service entity computing system 204 can determine which autonomous vehicles are available for a transportation service request. In some implementations, the available autonomous vehicle can include those that are currently online with the service entity 301 (e.g., actively engaged, logged in, etc. to a service entity platform/service entity infrastructure 200, etc.) and are not currently engaged in performance of a vehicle service, performance of a maintenance operation, and/or the like. In some implementations, the service entity computing system 204 can determine the availability of the autonomous vehicle based at least in part on data provided from the vehicle service provider (e.g., indicating that the vehicle service provider is online/ready to provide a vehicle service). This can include, for example, data communicated directly from the autonomous vehicle and/or from another computing system (e.g., a computing system of vendor X, a computing system of vendor Y, etc.). In some implementations, the service entity computing system 204 can monitor an autonomous vehicle (e.g., its progress along a route, when it comes online, etc.) to help determine whether the vehicle service provider is available to service a transportation service request.

Figure 4A:
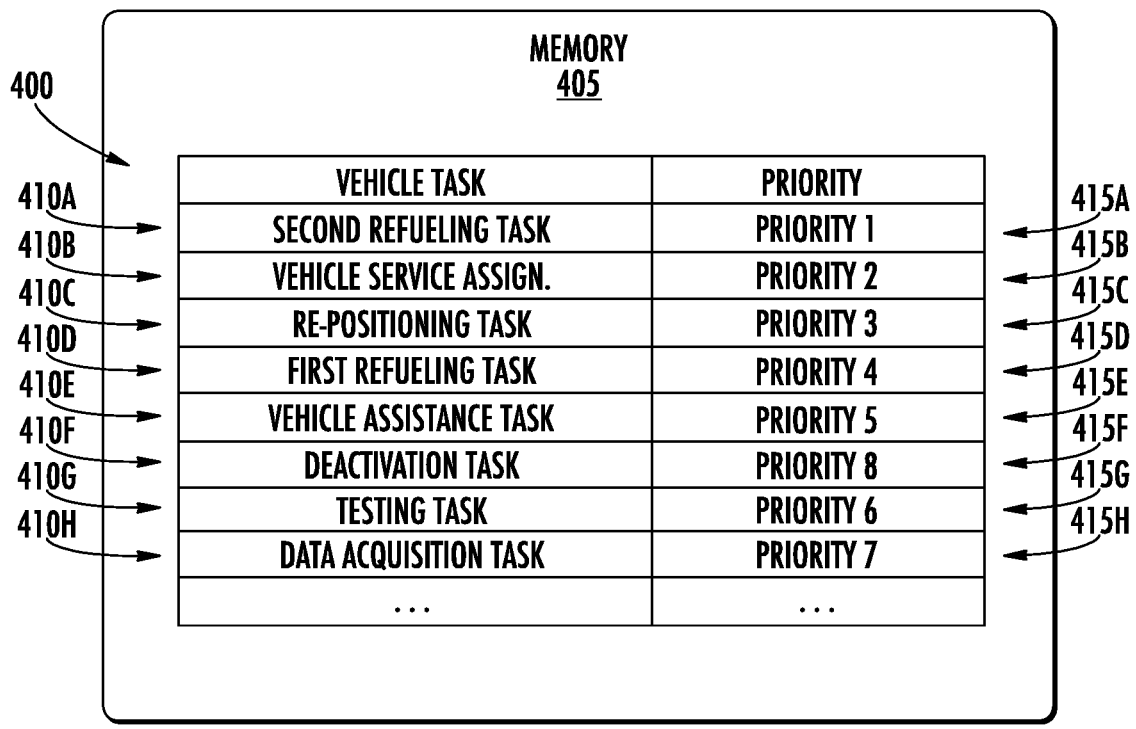
FIGS. 4A-B depicts an example data structures with refueling tasks according to example embodiments of the present disclosure.

Each autonomous vehicle 302, 304 that is online with the service entity 301 can be associated with an itinerary. The itinerary can be a data structure (e.g., a list, table, tree, queue, etc.) that is stored and accessible via a backend service of the infrastructure 200 (e.g., an itinerary service, etc.) The itinerary can include a sequence of tasks for the autonomous vehicle. For example, FIG. 4A depicts an example data structure 400 that can represent, for example, an itinerary of an autonomous vehicle. For a given autonomous vehicle, the itinerary can include tasks such as, for example: a first vehicle service assignment (e.g., to transport a user/item from one location to another), a re-positioning task (e.g., for the vehicle to re-position from one geographic area to another), a data acquisition task (e.g., to acquire sensor data of an unmapped/changed travel way, obstruction, etc.), an assistance task (e.g., to assist another autonomous vehicle), a refueling task (as further described herein), and/or other tasks.

The data structure 400 can be stored in an accessible memory 405. The data structure 400 can include a table, a hierarchy, a list, a queue (e.g., priority based, order based, time based, etc.), and/or other types of data structures. The data structure 400 can include data indicative of a plurality of vehicle tasks 410A-H. The service entity computing system 204 (and/or another type of computing system) can access memory 405 to obtain data indicative of one or more of the vehicle tasks 410A-H.

In some implementations, the tasks can be associated with the re-repositioning of an autonomous vehicle. This can include, for example, a supply re-positioning task 410C that instructs the autonomous vehicle to travel from a current location within a first geographic area to another location within a second geographic area. The second geographic area can have an imbalance in a number of vehicles associated with the second geographic area. The imbalance can include a deficit in the number of vehicles (e.g., located within and/or proximate to that geographic area and available to perform vehicle services associated therewith) as compared to a demand for vehicle services.

In some implementations, the vehicle tasks can be associated with the furtherance of a service entity's business and/or the development of autonomous vehicles associated with a service entity. Such a task can include, for example, a testing task 410G or a data acquisition task 410H. A testing task 410G can include the autonomous vehicle testing software and/or hardware that is implemented on the autonomous vehicle. This can include testing software associated with the vehicle's autonomy computing system (e.g., perception, prediction, motion planning, etc. software) and/or hardware (e.g., sensor hardware, etc.). A data acquisition task 410H can include acquiring sensor data associated with certain travel ways (e.g., for map generation, etc.) and/or the acquisition of sensor data associated with a condition in a geographic area (e.g., a scouting task to acquire sensor data associated with a travel way that has potentially changed, an obstruction, an accident, etc.).

In some implementations, the tasks can be associated with maintenance of the autonomous vehicle. For instance, a maintenance task can include the autonomous vehicle travelling to a service depot to receive scheduled maintenance, upgrade a software version, and/or obtain other maintenance/servicing.

In some implementations, the tasks can be associated with assisting other vehicles. This can include a vehicle assistance task 410E by which the autonomous vehicle in the idle state travels to assist another vehicle (e.g., autonomous vehicle, non-autonomous vehicle, etc.). For example, another autonomous vehicle may experience a fault such that the first autonomous vehicle performs a safe stop maneuver and pulls-over to the side of a travel way. The autonomous vehicle (in an idle state) can be sent to assist the other autonomous vehicle by picking-up any users that are being transporting in the other autonomous vehicle. In another example, the sensors of another autonomous vehicle can be occluded (e.g., due to a barrier, obstruction, etc.). A vehicle assistance task 410E can instruct the autonomous vehicle that is in an idle state to travel to a location that allows the other autonomous vehicle to acquire sensor data associated with the occluded area and transmit that sensor data to that autonomous vehicle. This can allow the occluded autonomous vehicle to understand what might be in the occluded area and plan its motion accordingly.

In some implementations, the autonomous vehicle may be assigned a deactivation task 410F. This can include the autonomous vehicle going offline with respect to the service entity. A deactivation task 410F can be considered a last resort in the event that another task is not available for the autonomous vehicle.

The vehicle tasks can in a vehicle service assignment 410B. The service entity computing system 204 can generate a vehicle service assignment 410B associated with performance of the transportation service request. For example, the service entity computing system 204 (and/or another system) can generate service assignment data that is indicative of a request (or command) for the vehicle service provider to perform a vehicle service for the transportation service request. The service assignment data can be indicative of the service origin, service destination, route, rating, risk profiles, preferences/special assistance of an associated user (e.g., music preferences, climate preferences, wheel chair accessibility, etc.), and/or other information.

When coordinating the performance of a vehicle service, the service entity computing system 204 can communicate the vehicle service assignment data to the one or more selected autonomous vehicles. The selected autonomous vehicles (and/or an associated remote computing system) can accept or decline the performance of the vehicle service(s) associated with the transportation service request. For example, the service entity computing system 204 can communicate the vehicle service assignment data to the selected autonomous vehicle to facilitate an acceptance by a autonomous vehicle before completing assignment of the transportation service request to the selected autonomous vehicle. In some implementations, an indication of an acceptance and/or rejection to perform the service(s) can be obtained from a computing system associated with an autonomous vehicle (e.g., onboard/remote from an autonomous vehicle, etc.), by a computing system associated with a third party vendor (e.g., a third party computing system 306, etc.), and/or the like. In some implementations, the data communicated in the initial vehicle service assignment data (e.g., offer for assignment data sent prior to receiving an acceptance and completing the assignment to the vehicle, etc.) may vary based on the type of vehicle service provider. For instance, in some implementations, the initial vehicle service assignment data provided to a first party autonomous vehicle 302 can include a request for confirmation that the autonomous vehicle 302 is capable of completing the vehicle service (e.g., free of faults that would prevent completion) while initial vehicle service assignment data provided to a third party autonomous vehicle 304 (or an associated third party computing system 306) can include a request for confirmation of interest in performing the vehicle service.

In some implementations, the initial vehicle service assignment data (e.g., offer for assignment data sent prior to receiving an acceptance and completing the assignment to the vehicle, etc.) may be communicated to a first selected autonomous vehicle (or an associated remote computing system) to facilitate an indication of acceptance or rejection of performance of the vehicle service assignment. For example, the service entity computing system 204 may obtain an assignment rejection from the first selected autonomous vehicle in response to the communicating the vehicle service assignment data. The service entity computing system 204 can determine a next selected autonomous vehicle for the transportation service request.

In some implementations, the service entity computing system 204 can communicate vehicle service assignment data (e.g., associated with a transportation service request) to a plurality of autonomous vehicles concurrently to facilitate an acceptance to perform the service associated with a transportation service request. As an example, the service entity computing system 204 can communicate the vehicle service assignment data to a plurality of autonomous vehicles. In response, the service entity computing system 204 can obtain an acceptance to perform a vehicle service associated with the transportation service request from one or more of the plurality of autonomous vehicles (or an associated remote computing system). In some implementations, the first of the plurality of autonomous vehicles (or an associated remote computing system) to indicate acceptance is assigned to perform the vehicle service associated with the transportation service request. In some implementations, service entity may establish a time window for receiving an acceptance to perform the service(s) from one or more of the available autonomous vehicles after communicating the vehicle service assignment data to the available autonomous vehicles.

The vehicle tasks can include one or more types of refueling tasks 410A, 410D. For example, the vehicles tasks can include a first refueling task 410D that is interruptible by another vehicle task or a second refueling task 410A that is not interruptible by the other vehicle task(s). As further described herein, the refueling tasks 410A, 410D can instruct an autonomous vehicle to travel to re-fuel based on the context of the autonomous vehicle.

The vehicle task(s) can be stored in a particular sequence for allocation to the autonomous vehicle. Additionally, or alternatively, each task 410A-H can be assigned a priority or weight 415A-H indicating the priority with which that task should be given with respect to other tasks. For example, the priority 415B associated with a vehicle service assignment 410B may be higher than the priority associated with a data acquisition task 410H. In some implementations, higher priority tasks can interrupt lower priority tasks such that an autonomous vehicle will cease the performance of the lower priority task in the event it receives (and accepts) a higher priority task. An interrupted task can be cancelled. In some implementations, the interrupted task can remain or be returned back into the vehicle's itinerary. In some implementations, the interrupted task may be removed or not returned back into the vehicle's itinerary.

In some implementations, an autonomous vehicle can be associated with more than one itinerary. For instance, an autonomous vehicle can be associated with a first itinerary (a "high priority" itinerary) that includes higher priority vehicle tasks. The tasks of the first itinerary can include tasks with priorities above a particular threshold. By way of example, a first itinerary can include second refueling tasks 410, vehicle service assignments 410B, and re-positioning tasks 410C. The autonomous vehicle can be associated with a second itinerary (a "low priority itinerary") that includes lower priority vehicle tasks. The tasks of the second itinerary can include tasks with priorities below a particular threshold. By way of example, a second itinerary can include first refueling tasks 410D, testing tasks 410G, data acquisition tasks 410H, etc.

The service entity computing system 204 can deploy tasks to the autonomous vehicle based at least in part on the first and second itineraries. For instance, the service entity computing system 204 can communicate data indicative of the tasks in the first itinerary (e.g., vehicle service assignment 410B) to the autonomous vehicle. In the event that no tasks are currently included in the first itinerary (the "high priority" itinerary), the service entity computing system 204 can communicate data indicative of the tasks in the second itinerary (e.g., data acquisition task 410H) to the autonomous vehicle. Accordingly, the service entity computing system 204 can ensure that the autonomous vehicle is provided with high priority tasks ahead of any low priority tasks.

With reference again to FIG. 3, as the first party autonomous vehicles 302 and/or third party autonomous vehicles 304 are providing vehicle services, the energy levels of the vehicles will dissipate over time. However, if the autonomous vehicles 302, 304 are constantly refueling, the vehicles may become unavailable to provide vehicle services at a time when the autonomous vehicle is needed. Additionally, in such a scenario, the autonomous vehicles 302, 304 may utilize their onboard resources (e.g., memory, processing, etc.) for traveling to service depots rather than transporting users, leading to inefficient resource usage. Thus, it is important for the service entity computing system 204 to determine when and how the autonomous vehicles 302, 304 should undertake refueling to maintain a sufficient supply of autonomous vehicles for vehicle services and to avoid inefficient use of vehicle resources.

To help determine appropriate autonomous vehicle refueling, the service entity computing system 204 can obtain data indicative of one or more vehicle conditions associated with an autonomous vehicle 302, 304. For example, the service entity computing system 204 can obtain one or more energy parameters 308 associated with an autonomous vehicle 302, 304. The energy parameters 308 can be indicative of a past, current, and/or future: energy level (e.g., gas level, charge level, etc.), an energy capacity (e.g., gasoline capacity, charge capacity, etc.), energy efficiency (e.g., distance per gallon of gasoline, distance/time per amount of charge, etc.), and/or other energy related vehicle characteristics. The energy parameters 308 can be specific to the individual autonomous vehicle, the type of autonomous vehicle, and/or a fleet to which the autonomous vehicle belongs. In some implementations, the service entity computing system 204 can obtain data 309 indicative of the route and/or geographic area in which the autonomous vehicle 302, 304 has, is, or will be traveling. In some implementations, the service entity computing system 204 can obtain data 311 indicative of the past, current, or future projected volume/demand for vehicle services and/or the supply of vehicles to perform those vehicle services. For example, the service entity computing system 204 can determine that during a typical commute time in a geographic area there may be a high demand for vehicle services. The service entity computing system 204 can determine the available vehicle supply for that demand and determine whether an autonomous vehicle 302, 304 may experience a high volume of vehicle service assignments based at least in part on that demand and supply.

The service entity computing system 204 can also, or alternatively, obtain data indicative of one or more operational capabilities 310 of an autonomous vehicle 302, 304. The operational capabilities 310 can describe the autonomy capabilities of the autonomous vehicle 302, 304, the restrictions of an autonomous vehicle 302, 304, scenes, scenarios, types of areas, and/or specific geographic areas in which the autonomous vehicle 302, 304 can operate, and/or other information descriptive of how an autonomous vehicle 302, 304 can or cannot autonomously operate. For example, the operational capabilities 310 can indicate whether an autonomous vehicle 302, 304 can perform a U-turn and/or whether the autonomous vehicle 302, 304 is restricted from performing an unprotected left turn. In another example, the operational capabilities 310 can indicate that an autonomous vehicle 302, 304 is capable of operating in a high traffic area (e.g., an urban setting, etc.) and/or the geographic fences/boundaries for where the autonomous vehicle 302, 304 can or cannot travel (e.g., based on the map data available to the autonomous vehicle, vehicle provider preferences, etc.).

The data indicative of the vehicle condition(s) (e.g., energy parameter(s), vehicle service volume/supply information, operational capability data, etc.) can be obtained from the autonomous vehicle 302, 304 and/or via another computing system. For example, the service infrastructure 200 of the service entity 301 can allow a first party autonomous vehicle 302 of the service entity 301 (or a third party autonomous vehicle 304) to communicate data indicative of the vehicle's energy parameters 308 to the service entity computing system 204. Additionally, or alternatively, the service infrastructure 200 can allow a third party computing system 306 associated with a third party vehicle provider (e.g. that puts at least a portion of its fleet online with the service entity) to communicate data indicative of energy parameters 308, operational capabilities 310 etc. to the service entity computing system 204. The vehicle conditions for an autonomous vehicle 302, 304 (and/or an associated fleet) can be stored and/or otherwise accessible by the service entity computing system 204 (e.g., within a profile for the autonomous vehicle and/or fleet, etc.).

Returning to FIG. 4A, the service entity computing system 204 can determine a refueling task for the autonomous vehicle 302, 304 based at least in part on the energy parameters 308 associated with the autonomous vehicle 302, 304 and/or other condition(s) associated with the autonomous vehicle 302, 304. The refueling task can include instructions requesting (or commanding) that the autonomous vehicle 302, 304 travel to a location to replenish the vehicle's onboard energy resources. This can include the replenishment of combustible fuel (e.g., gasoline), electric charge (e.g., for onboard batteries, etc.), and/or other types of energy. In some implementations, the refueling task can include data indicative of a location of a service depot that is suitable for the autonomous vehicle 302, 304 to replenish the vehicle's onboard energy supply (e.g., a service depot that has the infrastructure and type of energy needed for the autonomous vehicle). In some implementations, the refueling task can include a route for the autonomous vehicle 302, 304 to follow to arrive at the service depot. In some implementations, the refueling task may not indicate a location of a service depot and/or a route. The autonomous vehicle 302, 304 and/or another computing system (e.g., a third party computing system 306) can determine an appropriate location for energy replenishment and/or a route thereto based at least in part, for example, on map data, traffic data, etc.

The service entity computing system 204 can select different types of refueling tasks for an autonomous vehicle 302, 304. For example, the refueling task can include a first refueling task 410D that is interruptible by another vehicle task. As described herein, the first refueling task 410D can be referred to as a "soft" refueling task. The first refueling task 410D can be interruptible in that the autonomous vehicle 302, 304 (and/or another computing system) can pause, cancel, hold, etc. the performance of the first refueling task 410D in the event that the autonomous vehicle 302, 304 is allocated another vehicle task such as, for example, a vehicle service assignment 410B (e.g., to transport a user/item, etc.).

In some implementations, a first refueling task 410C can prevent the allocation of additional vehicle tasks to an itinerary associated with the autonomous vehicle 302, 304. For example, an autonomous vehicle 302, 304 may have one or more vehicle tasks in an itinerary associated with the autonomous vehicle 302, 304. The service entity computing system 204 may communicate a first "soft" refueling task 410B to an autonomous vehicle 302, 304 (and/or place it in the itinerary). In some implementations, once the first refueling task 410D is allocated to the autonomous vehicle 302, 304 no additional vehicle tasks can be added to an itinerary associated with the autonomous vehicle 302, 304 (e.g., until the first refueling task 410D is complete). This can help limit the continuous interruption of the first refueling task 410D by other vehicle tasks.

In some implementations, the refueling task can include a second refueling task 410A that is uninterruptible by another vehicle task. The second refueling task 410A can be referred to as a "hard" refueling task. The second refueling task 410A can be uninterruptible in that the autonomous vehicle 302, 304 (and/or another computing system) will not pause, cancel, hold, etc. the performance of the second refueling task 410A in the event that the autonomous vehicle 302, 304 is allocated another vehicle task such as, for example, a vehicle service assignment 410B.

Figure 4B:
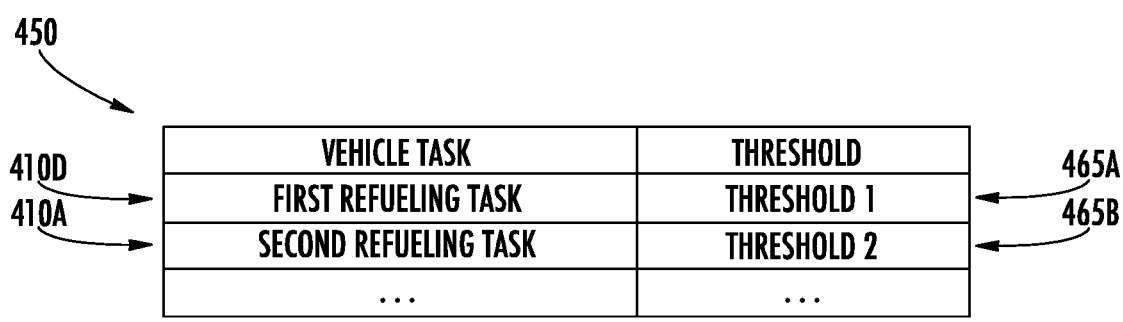

Each type of refueling task can be associated with a threshold. For example, the first refueling task 410D can be associated with a first energy threshold 465A (shown in FIG. 4B). The first energy threshold 465A can be indicative of a vehicle energy level at which it would be preferable, desirable, etc. to replenish the vehicle's energy supply. The first energy threshold 465A can be a soft threshold at which the autonomous vehicle 302, 304 is not required to replenish its onboard energy supply. By way of example, the first energy threshold 465A can be 50% of the vehicle's energy capacity. The second refueling task 410A can be associated with a second energy threshold 465B. The second energy threshold 465B can be indicative of a vehicle energy level at which the autonomous vehicle 302, 304 is required to replenish the vehicle's onboard energy supply. By way of example, the second energy threshold 465B can be 25% of the vehicle's energy capacity. Thus, the first energy threshold 465A can be greater than the second energy threshold 465B (which indicates a lower energy level).

The energy thresholds can be based on a variety of factors. For example, the first and/or second energy threshold 465A, B can be based at least in part on the operational capabilities 310 of the autonomous vehicle 302, 304 and/or its associated fleet. By way of example, an autonomous vehicle 302, 304 with higher energy efficiency may have lower energy thresholds associated with the refueling tasks because the autonomous vehicle 302, 304 can travel further on a lower level of energy. In another example, an autonomous vehicle 302, 304 that has less restrictions on its autonomous navigability/maneuverability may have lower energy thresholds for the refueling tasks. For instance, a first autonomous vehicle (e.g., associated with a fleet of a vendor X) may be able to perform U-turns and unprotected left turns. A second autonomous vehicle (e.g., associated with a fleet of a vendor Y) may not be able to perform U-turns and unprotected left turns. The refueling task energy thresholds for the first autonomous vehicle (and/or the first fleet) can be lower than the refueling task energy thresholds for the second autonomous vehicle because the first autonomous vehicle may be able to travel along a more efficient route to a service depot for energy replenishment. The refueling task energy thresholds may be higher for the second autonomous vehicle (and/or the second fleet) to account for any inefficiencies in the second autonomous vehicle's travels due to its operational capabilities 310 (e.g., restrictions on autonomy capability).

In some implementations, the refueling task energy thresholds can be based at least in part on a third party vehicle provider. For instance, the service entity 301 and a vehicle provider (e.g., vendor X, vendor Y, etc.) may determine what the first and/or second energy thresholds should be for a given autonomous vehicle and/or the fleet of the vehicle provider. This can allow the vehicle provider to provide explicit input into refueling tasks and the circumstances in which they may be triggered.

Each refueling task can be associated with a priority. For instance, as described herein, an autonomous vehicle 302, 304 can be associated with an itinerary that includes a plurality of tasks for the autonomous vehicle 302, 304. Each task in the itinerary can include a priority. The priority can indicate an importance/urgency of the task and inform an autonomous vehicle 302, 304 (and/or another computing system) which task should be performed by the autonomous vehicle 302, 304 among the plurality of tasks. By way of example, as described herein, a first refueling task 410D (e.g., the "soft" refueling task) can interruptible by another vehicle task such as a vehicle service assignment 410B. The vehicle service assignment 410B can be associated with a higher priority than the first refueling task 410D. As described herein, the second refueling task 410A (e.g., the "hard" refueling task) can be uninterruptible by another vehicle task. As such, the second refueling task 410A can be associated with a higher priority than the other vehicle tasks (e.g., a vehicle service assignment 410B, re-positioning task 410C, vehicle assistance task 410E, etc.).

The service entity computing system 204 can determine a refueling task for an autonomous vehicle 302, 304 based at least in part on the energy threshold(s) and/or priorities. For instance, in the event that energy level of the autonomous vehicle is below the first energy threshold 465A but above the second energy threshold 465B, the service entity computing system 204 can determine that the autonomous vehicle 302, 304 should perform the first refueling task 410D. This can allow the autonomous vehicle 302, 304 to be assigned another vehicle task in the event a higher priority vehicle task is appropriate. For example, the autonomous vehicle 302, 304 can still be available to perform a vehicle service assignment 410B in the event the autonomous vehicle 302, 304 is matched with a service request. In the event that the energy level of the autonomous vehicle 302, 304 is below the second energy threshold, the service entity computing system 204 can determine that the autonomous vehicle 302, 304 should perform the second refueling task 410A. If accepted, the autonomous vehicle 302, 304 can become unavailable to perform another vehicle task (e.g., a vehicle service assignment 410B). As further described herein, the autonomous vehicle 302, 304 may be unavailable until the vehicle's energy level reaches a certain level (e.g., above the second energy threshold, first energy threshold, etc.).

In some implementations, the refueling task can be based at least in part on a vehicle service assignment. For example, the service entity computing system 204 can determine the route, destination, traffic level, travel distance, travel time, etc. associated with transporting a user associated with a service request. This can allow the service entity computing system 204 to predict whether an assigned autonomous vehicle 302, 304 should be given a refueling task based at least in part the performance of the vehicle service assignment. The service entity computing system 204 can determine whether the energy level of the autonomous vehicle 302, 304 will fall below the first and/or second thresholds 465A, B while or after transporting the user based at least in part on the vehicle's energy parameters, route, operational capabilities, etc.

Figure 5:
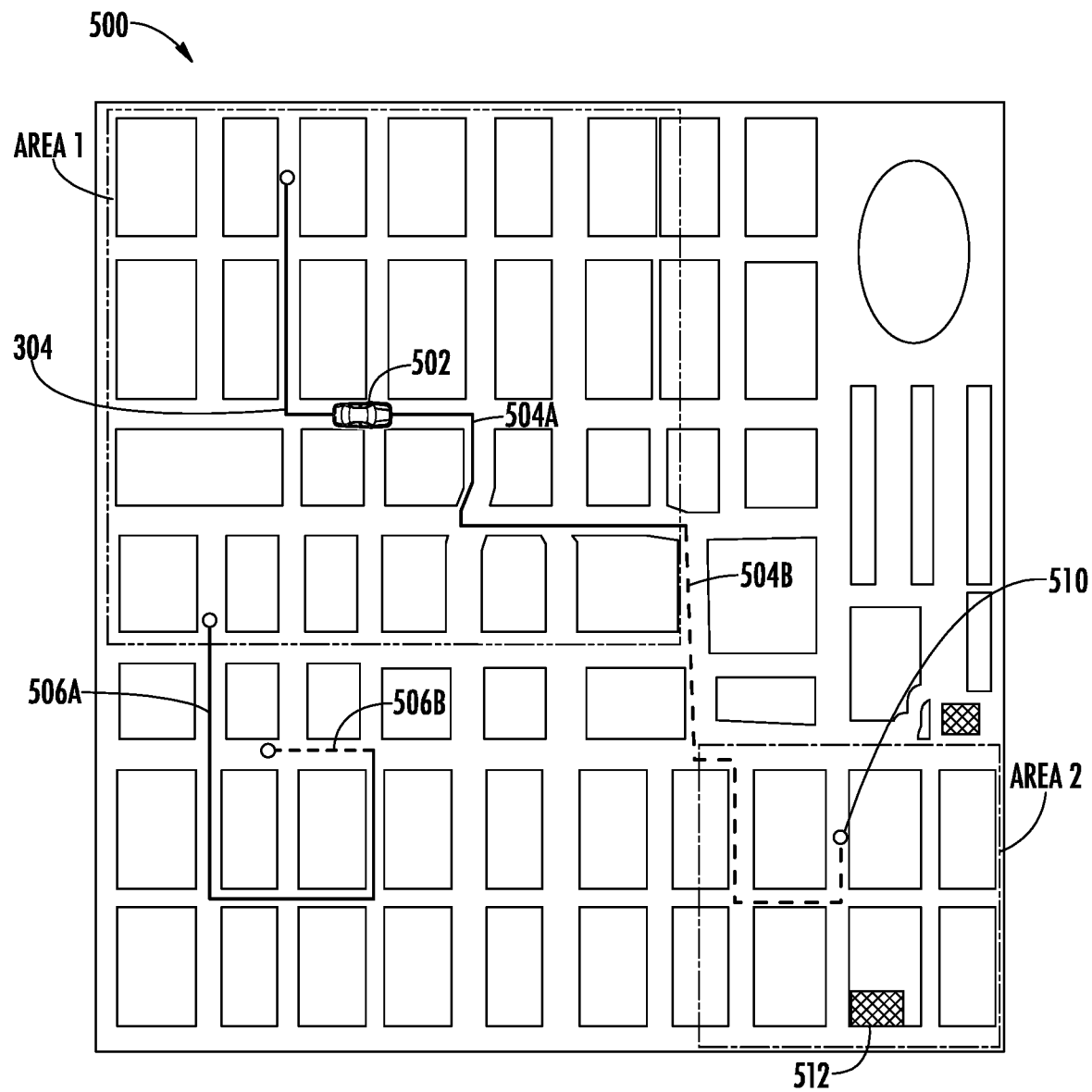
FIG. 5 depicts an example geographic area according to example embodiments of the present disclosure.

The service entity computing system 204 can determine that an energy level of the autonomous vehicle 302, 304 will fall below a first threshold 465A associated with the first refueling task 410A based at least in part on the energy parameters 308 associated with the autonomous vehicle 302, 304 and the vehicle service assignment. For example, with reference to FIG. 5, the service entity computing system 204 can determine that an autonomous vehicle 502 would travel along a route with multiple segments 504A-B for a vehicle service assignment. The service entity computing system 204 can determine/predict that the energy level of the autonomous vehicle 502 would fall below a first threshold 465A associated with the first refueling task 410D based at least in part on the energy parameters 308 associated with the autonomous vehicle 502 for second segment 504B. Accordingly, the service entity computing system 204 can select the first refueling task 410D for the autonomous vehicle 502 (e.g., when the autonomous vehicle 502 reaches the segment 504B). The first refueling task 410D can be allocated to the autonomous vehicle 502 and/or included in an associated itinerary before, at it begins, during, and/or after the autonomous vehicle 500 travels along the second segment 504B.

In another example, the service entity computing system 204 can determine that the autonomous vehicle 502 would travel along a route with multiple segments 506A-B to perform another vehicle service assignment. The service entity computing system 204 can determine that an energy level of the autonomous vehicle 502 will fall below a second threshold 465B associated with the second refueling task 410A based at least in part on the energy parameters 308 associated with the autonomous vehicle 502 and the vehicle service assignment, along the segment 506B. Accordingly, the service entity computing system 204 can select the second refueling task 410A for the autonomous vehicle 302, 304 (e.g., when the autonomous vehicle 502 reaches the segment 506B). The service entity computing system 204 can include the selected first and/or second refueling tasks 410D, 410B in an itinerary associated with the autonomous vehicle 302, 304.

In some implementations, the service entity computing system 204 can determine a refueling task for an autonomous vehicle 302, 304 based at least in part on a destination associated with a vehicle task to be performed by the autonomous vehicle 302, 304. For example, with reference to FIG. 5, the autonomous vehicle 502 may be performing or is to perform a vehicle service assignment or another type of task. The destination location 510 associated with the vehicle service assignment (or other task) can be proximate to a service depot 512 suitable for the refueling task. For example, performance of the vehicle service assignment may result in the autonomous vehicle 502 being located proximate (e.g., within 1-10 blocks, within 1 mile, etc.) a service depot that is suitable for the autonomous vehicle 502 to replenish its energy level. The energy level of the autonomous vehicle 502 may (or may not) fall below the first or second energy threshold 465A, 465B due to the performance of the vehicle service assignment (or other vehicle task). In either case, the service entity computing system 204 can determine that it would be efficient for the autonomous vehicle 502 to replenish its energy level at the service depot. Accordingly, the service entity computing system 204 can select a first or second refueling task 410D, 410A for the autonomous vehicle 502 such that the autonomous vehicle 502 is instructed to travel to replenish its energy supply at the nearby service depot 512.

In some implementations, the service entity computing system 204 can determine a refueling task for an autonomous vehicle 302, 304 based at least in part on the operational capabilities of the autonomous vehicle 302, 304. For instance, with reference to FIG. 3, the service entity computing system 204 can obtain data indicative of one or more operational capabilities 310 of a first autonomous vehicle. The operational capabilities 310 can indicate that the first autonomous vehicle can autonomously perform a U-turn maneuver and an unprotected left turn maneuver. The service entity computing system 204 can obtain data indicative of one or more operational capabilities 310 of a second autonomous vehicle. The operational capabilities 310 of the second autonomous vehicle can indicate that the second autonomous vehicle cannot autonomously perform a U-turn maneuver or an unprotected left turn maneuver. Based at least in part on the operational capabilities 310, the service entity computing system 204 can determine that the first autonomous vehicle should be allocated a first refueling task 410D because the first autonomous vehicle is likely to be able to take more efficient vehicle routes and, thus, perform other vehicle tasks without its energy level falling below the second threshold 465B. Additionally, or alternatively, the service entity computing system 204 can determine that the second autonomous vehicle should be allocated a second refueling task 410A because the second autonomous vehicle is likely to be able to take less efficient vehicle routes given the restrictions on its autonomy capability and, thus, is more likely to fall below the second threshold 465B if assigned another vehicle task.

In some implementations, the service entity computing system 204 can determine the refueling task for an autonomous vehicle 302, 304 based at least in part on one or more other vehicle conditions. For example, the service entity computing system 204 can obtain data indicative of the past, present, and/or future (predicted) volume/demand for vehicle services and/or other vehicle tasks (e.g., within a geographic area). The service entity computing system 204 can also, or alternatively, obtain data indicative of the past, present, and/or future (predicted) supply of vehicles that are online with the service entity 301 and available to perform those vehicle services. The service entity computing system 204 (and/or another computing system) can determine whether it would be more valuable for an autonomous vehicle 302, 304 to be available to perform requested vehicle services and/or another task than perform a refueling task. For example, in the event that it would be beneficial for the autonomous vehicle 302, 304 to be available to perform vehicle service assignments (e.g., to help maintain sufficient supply, to avoid inefficient vehicle resource usage, to increase revenue, etc.), the service entity computing system 302, 304 can determine that the first refueling task 410D for the autonomous vehicle 302, 304 should be selected so that the autonomous vehicle 302, 304 can be interrupted to perform a vehicle service assignment.

The service entity computing system 204 can communicate data indicative of the refueling task to the autonomous vehicle 302, 304 or to a second computing system associated with the autonomous vehicle 302, 304 and remote from the autonomous vehicle 302, 304. The second computing system can include a computing system that manages the autonomous vehicle 302, 304 such as, for example, a third party computing system 306. In some implementations, the data indicative of the refueling task can be communicated with data indicative of another vehicle task, so that the autonomous vehicle 302, 304 can undertake the refueling task before and/or after the performance of the other vehicle task. For instance, the service entity computing system 204 can communicate the data indicative of the refueling task with a vehicle service assignment. By way of example, a first refueling task 410D (e.g., a "soft" refueling task) can be communicated with a vehicle service assignment 410B so that the autonomous vehicle 302, 304 travels to replenish its energy level after dropping-off a user/item. In another example, a second refueling task 410A (e.g., a "hard" refueling task) can be communicated with a re-positioning task 410C so that the autonomous vehicle 302, 304 replenishes its energy level before repositioning. In another example, the data indicative of the refueling task can be communicated separately from data indicative of another task. This can include communicating the data indicative of the refueling task before, during, and/or after the autonomous vehicle 302, 304 performs another vehicle task (e.g., a vehicle service assignment 410B, re-positioning task 410C, etc.).

In some implementations, the service entity computing system 204 can communicate the data indicative of the refueling task based at least in part on the type of autonomous vehicle. For instance, the service entity computing system 204 can communicate the data indicative of the refueling task to a first party autonomous vehicle 302 (shown in FIG. 3). The data indicative of the refueling task can indicate the type of refueling task (e.g., first refueling task, second refueling task, etc.), a priority, a location of a service depot, a route to a service depot, and/or other types of information. The first party autonomous vehicle 302 can determine whether or not to accept or reject the refueling task. For example, the first party autonomous vehicle 302 may be configured to accept the refueling task unless it is physically unable to perform the refueling task (e.g., due to a vehicle defect). Additionally, or alternatively, the service entity computing system 204 can communicate the data indicative of the refueling task to a remote computing system for a third party autonomous vehicle 304 (e.g., a third party computing system 306). The remote computing system (e.g., a third party computing system 306) can determine whether to accept or reject the refueling task for the third party autonomous vehicle 304 and/or communicate the refueling task to the third party autonomous vehicle 304, which can make such a determination. For example, the remote computing system (e.g., a third party computing system 306) may reject the refueling task in the event the vehicle provider (e.g., vendor X, vendor Y, etc.) determines that it would rather have the third party autonomous vehicle 306 perform or be available for another vehicle task (e.g., a vehicle service assignment).

The service entity computing system 204 can determine whether the refueling task for the autonomous vehicle 302, 304 has been accepted or rejected. In some implementations, the service entity computing system 204 can obtain data indicative of an acceptance or rejection of the refueling task from an autonomous vehicle 302, 304 and/or another computing system (e.g., a third party computing system 306). In some implementations, the service entity computing system 204 can monitor the autonomous vehicle 302, 304 (e.g., its location, motion, intended route, etc.) and deduce whether the refueling task has been accepted or rejected. For example, in the event that the service entity computing system 204 determines that the autonomous vehicle 302, 304 is travelling along a route to arrive at a service depot that is appropriate for the vehicle's energy replenishment, the service entity computing system 204 can determine that the refueling task has been accepted. In another example, in the event that the service entity computing system 204 determines that the autonomous vehicle 302, 304 is travelling along a route to reposition itself to another geographic area (not proximate a service depot), the service entity computing system 204 can determine that the refueling task has been rejected.

The service entity computing system 204 can determine at least a portion of an itinerary associated with an autonomous vehicle 302, 304 based at least in part on an acceptance or rejection of the refueling task. For instance, in the event that the refueling task is accepted the refueling task can be maintained in the vehicle's itinerary or placed into the vehicle's itinerary if it has not already been included in the itinerary. In another example, in the event that the refueling task is rejected the service entity computing system 204 may not include the refueling task in the vehicle's itinerary, may remove the refueling task from the vehicle's itinerary, and/or deprioritize the refueling task in the vehicle's itinerary (e.g., by lowering the associated priority).

The service entity computing system 204 can determine whether an autonomous vehicle 302, 304 performing a refueling task should be selected for a vehicle service. For instance, the service entity computing system 204 can obtain data indicative of a service request for a vehicle service. This can include, for example, a request to transport a user from an origin location to a destination location. The service entity computing system 204 can determine whether to select the autonomous vehicle 302, 304 (performing the refueling task) or a different another vehicle for the service request based at least in part on the refueling task. For example, in response to determining that an autonomous vehicle 302, 304 has accepted a first refueling task 410D (e.g., an interruptible "soft" refueling task), the service entity computing system 204 can select the autonomous vehicle 302, 304 for the service request. In response to determining that the autonomous vehicle 302, 304 is to be selected for the service request, the service entity computing system 204 can generate a vehicle service assignment 410B based at least in part on the service request. The vehicle service assignment 410B can indicate the user's origin, requested destination, and/or other service conditions. The vehicle service assignment 410B can also be associated with a higher priority 415B than a priority 415D of first refueling task 410D. The service entity computing system 204 can communicate data indicative of the vehicle service assignment 410B for the autonomous vehicle 302, 304 to the autonomous vehicle 302, 304 or a second computing system (e.g., a third party computing system 306), etc. In the event the vehicle service assignment 410B is accepted (e.g., by the vehicle, a third part computing system, etc.), the refueling task can be cancelled. For example, the service entity computing system 204 can communicate a request to cancel the first refueling task 410D based at least in part on the vehicle service assignment 410B. In some implementations, the service entity computing system 204 can re-communicate the data indicative of the refueling task for the autonomous vehicle 302, 304 after or at a predetermined time (e.g., 3 minutes, 2 minutes, 1 minute, 30 seconds, etc.) prior to a completion the vehicle service assignment 410B by the autonomous vehicle 302, 304.

In the event an autonomous vehicle 302, 304 is performing a second refueling task 410A (e.g., an uninterruptible "hard" refueling task), the service entity computing system 204 may have several options for proceeding with respect to a service request. For instance, the service entity computing system 204 can determined that the autonomous vehicle 302, 304 is performing the second refueling task. In some implementations, the service entity computing system 204 can determine not to select the autonomous vehicle 302, 304 for the service request when the autonomous vehicle 302, 304 has accepted a second refueling task 410A. For example, in response to determining that the autonomous vehicle 302, 304 has accepted the second refueling task 410A, the service entity computing system 204 can select a different autonomous vehicle for the service request.

In some implementations, the service computing system can determine whether a vehicle service assignment associated with the service request can be forward dispatched to the autonomous vehicle 302, 304 performing the second refueling task. For example, an autonomous vehicle 302, 304 can be performing the second refueling task by travelling to a service depot and replenishing its energy supply (e.g., obtaining more gasoline, re-charging its batteries, etc.). The service entity computing system 204 can obtain updated energy parameters for the autonomous vehicle 302, 306 (e.g., directly from the vehicle, from a third party computing system 306, etc.). The updated energy parameters can include an updated energy level for the autonomous vehicle 302, 304. The operations computing system can determine that the updated energy level of the autonomous vehicle 302, 304 is above (or nearing) a threshold 465B associated with the second refueling task 410A. This can indicate that the autonomous vehicle 302, 304 may soon be available again to perform vehicle service assignments. In some implementations, when the updated energy level becomes above the second energy threshold 465B, the service entity computing system 204 can indicate the autonomous vehicle 302, 304 as now performing a first refueling task 410C that is interruptible by another vehicle task. The service entity computing system 204 can select the autonomous vehicle 302, 304 for a service request based at least in part on the updated energy level, even though the autonomous vehicle 302, 304 is performing a second refueling task 410A because the time to completion of the second refueling task 410A is short enough that a vehicle service assignment can be sufficiently performed.

In some implementations, the service entity computing system 204 can configure its allocation of refueling tasks based at least in part on feedback from autonomous vehicles and/or third party vehicle providers. For example, with reference again to FIG. 3, the service entity computing system 204 can obtain feedback data 312 indicative of previous acceptance(s) or rejection(s) of previous refueling task(s). The feedback data 312 can be associated with, for example, a third party vehicle provider (e.g., vendor X, vendor Y, etc.) that has placed at least a portion of its autonomous vehicle fleet online with the service entity. The refueling task for an autonomous vehicle 302, 304 can be based at least in part on the feedback data 312. For example, based on the feedback data 312, the service entity computing system 204 can adjust its analysis for determining refueling tasks for the third party autonomous vehicles 304 associated with a third party vehicle provider. For instance, a first threshold 465A associated with a first refueling task 410D and/or a second threshold 465B associated with a second refueling task 410A can be adjusted based at least in part on the feedback data 312 associated with the third party vehicle provider. By way of example, in the event that the third party vehicle provider is rejecting first refueling tasks 410D (e.g., "soft" refueling tasks), the first threshold 465A associated with a first refueling task 410D can be lowered such that the energy level of the autonomous vehicle 304 should be lower in order to trigger the assignment of a first refueling task 410D.

For third party autonomous vehicles 304, a third party computing system 306 can be configured to determine whether to accept or reject a refueling task for an autonomous vehicle 304 in its associated fleet. The third party computing system 306 can include one or more processors and one or more tangible, non-transitory, computer readable media that collectively store instructions that when executed by the one or more processors cause the computing system to perform operations. The operations can be executed to determine whether to accept or rejection the refueling task. For example, the third party computing system 306 can obtain data indicative of a refueling task for an autonomous vehicle 304. As described herein, the refueling task can include a first refueling task 410D that is interruptible by another vehicle task or a second refueling task 410A that is not interruptible by the other vehicle task. The third party computing system 306 can obtain one or more vehicle conditions associated with the autonomous vehicle 304. This can include, for example, energy parameters of the autonomous vehicle 304, route/geographic information 309, operational capabilities 310, supply/demand information 311, etc.

The third party computing system 306 can determine whether to accept or reject the refueling task for the autonomous vehicle 304 based at least in part on the one or more vehicle conditions associated with the autonomous vehicle 304. By way of example, the third party computing system 306 can determine that although the energy level associated with the autonomous vehicle 306 is below the second threshold 465B associated with a second refueling task 410A, the supply/demand information 311 may indicate that the autonomous vehicle 306 would likely receive one or more vehicle service assignments. Thus, the third party computing system 306 can reject the refueling task for the autonomous vehicle 304 so that the autonomous vehicle 304 is available to perform a vehicle service assignment. Alternatively, the third party computing system 306 can determine to accept the refueling task for the autonomous vehicle 304 when the refueling task is the second refueling task 410A.

The third party computing system 306 can communicate data indicative of the rejection (or an acceptance) of the refueling task for the autonomous vehicle 304 (e.g., to the service entity computing system 204). This data can be included as feedback data 312 associated with the autonomous vehicle 304 and the third party vehicle provider.

Figure 6:
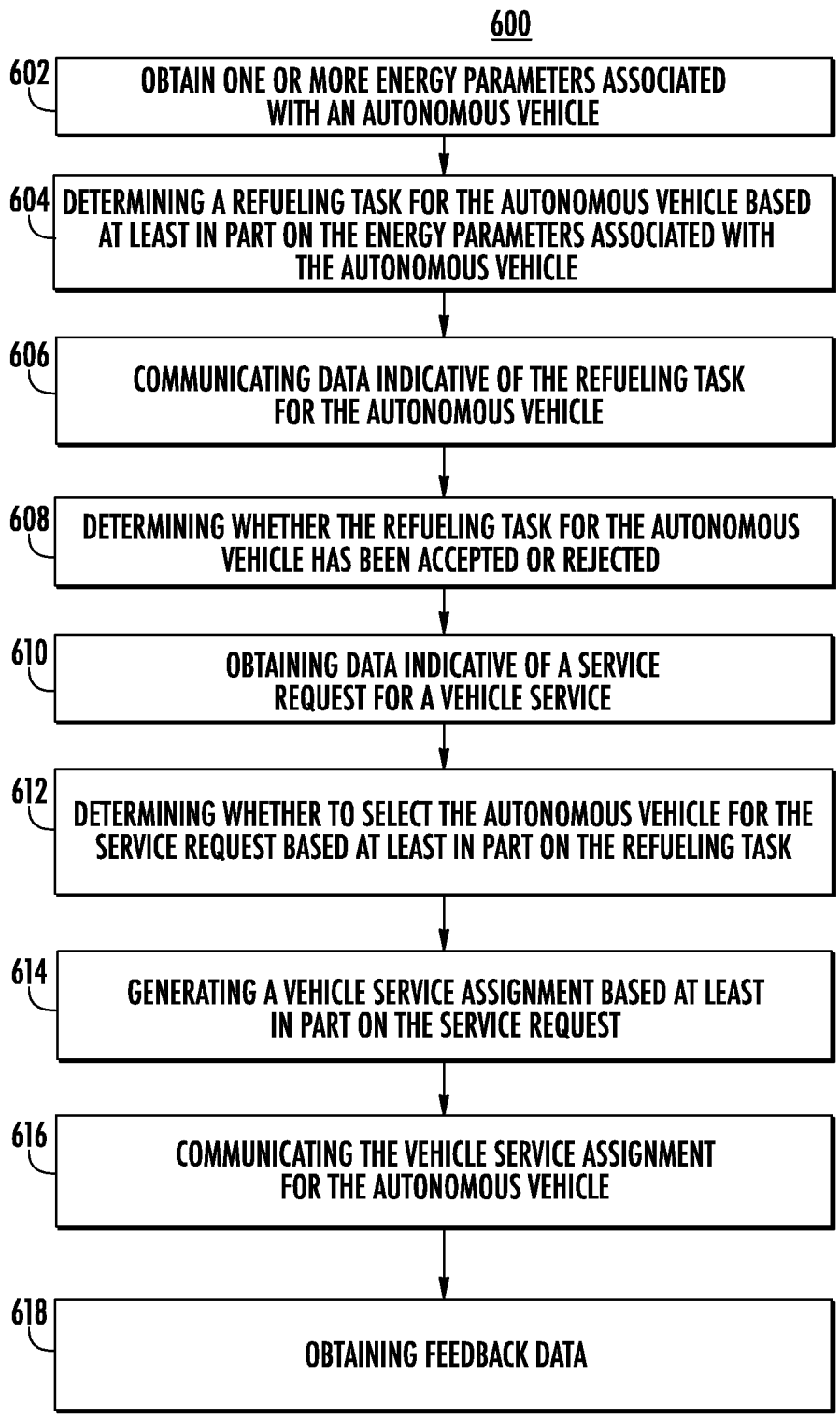
FIG. 6 depicts a flow diagram of an example method for autonomous vehicle energy replenishment according to example embodiments of the present disclosure.

FIG. 6 depicts a flow diagram of an example method 600 for autonomous vehicle energy replenishment according to example embodiments of the present disclosure. One or more portion(s) of the method 600 can be implemented by one or more computing devices such as, for example, the computing devices described in FIG. 1, 2, 3, 7, or 8. Moreover, one or more portion(s) of the method 600 can be implemented as an algorithm on the hardware components of the device(s) described herein (e.g., as in FIGS. 1, 2, 3, 7, and 8) to, for example, coordinate the replenishment of the energy resources for autonomous vehicles. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (602), the method 600 can include obtaining one or more energy parameters associated with an autonomous vehicle. For instance, a computing system (e.g., service entity computing system 204) can obtain one or more energy parameters associated with an autonomous vehicle. As described herein, the energy parameter(s) can be indicative of past, present, and/or future energy parameters of the autonomous vehicle (e.g., energy level, energy efficiency, etc.). The computing system can obtain data indicative of other vehicle conditions including, for example, supply/demand information, routing information, vehicle operational capacities, etc.

At (604), the method 600 can include determining a refueling task for the autonomous vehicle based at least in part on the energy parameters associated with the autonomous vehicle. For instance, a computing system can determine a refueling task for the autonomous vehicle based at least in part on the energy parameters associated with the autonomous vehicle. As described herein, the refueling task can include a first refueling task that is interruptible by a vehicle service assignment or a second refueling task that is not interruptible by the vehicle service assignment. The first refueling task can be associated with a first energy threshold and the second refueling threshold can be associated with a second energy threshold. The first energy threshold can be greater than the second energy threshold. In some implementations, the computing system can obtain data indicative of one or more operational capabilities of the autonomous vehicle. The first refueling task and the second refueling task can be based at least in part on the one or more operational capabilities of the autonomous vehicle. For example, a threshold associated with a refueling task can be adjusted based on the vehicle's operational capabilities. In another example, the computing system can determine a refueling task for an autonomous vehicle based at least in part on the operational capabilities. For instance, a soft refueling task may be selected for an autonomous vehicle with more robust autonomy capabilities that can autonomous navigate more efficient routes (e.g., with left turns, etc.).

At (606), the method 600 can include communicating data indicative of the refueling task for the autonomous vehicle. For instance, a computing system can communicate data indicative of the refueling task to the autonomous vehicle or to a second computing system that manages the autonomous vehicle (e.g., a third party computing system 306).

At (608), the method 600 can include determining whether the refueling task for the autonomous vehicle has been accepted or rejected. For instance, a computing system can determine whether the refueling task for the autonomous vehicle has been accepted or rejected. For example, the computing system can obtain data explicitly indicating an acceptance or rejection of the refueling task. In another example, the computing system can monitor the autonomous vehicle (e.g., its location) to determine whether the autonomous vehicle is traveling to a service depot for energy replenishment.

At (610), the method 600 can include obtaining data indicative of a service request for a vehicle service. For instance, a computing system can obtain data indicative of a service request for a vehicle service. The vehicle service can include transporting a user and/or an item (e.g., food, package, etc.). The computing system can determine whether to select the autonomous vehicle for the service request based at least in art on the refueling task, at (612). For instance, the computing system can select the autonomous vehicle or a different autonomous vehicle for the service request based at least in part on the refueling task. By way of example, in response to determining that the autonomous vehicle has accepted the second refueling task, the computing system can select the different autonomous vehicle for the service request.

In response to determining that the autonomous vehicle has accepted the first refueling task, the computing system can select the autonomous vehicle for the service request. More particularly, in response to determining that the autonomous vehicle is to be selected for the service request, the computing system can generate a vehicle service assignment based at least in part on the service request, at (614). The vehicle service assignment can identity, for example, an origin location, destination location, type of service, etc. The computing system can communicate data indicative of the vehicle service assignment to at least one of the autonomous vehicle or the second computing system that manages the autonomous vehicle (e.g., a third party computing system), at (616). The vehicle service assignment can be associated with a higher priority than a priority of the first refueling task. In some implementations, this can result in the autonomous vehicle cancelling, pausing, etc. the first refueling task. In some implementations, the computing system can communicate (e.g., to the autonomous vehicle, a remote computing system associated therewith) a request to cancel the first refueling task based at least in part on the vehicle service assignment.

In some implementations, the first refueling task can be deployed for the autonomous vehicle again. For example, the computing system can communicate data indicative of the first refueling task for the autonomous vehicle after or at a predetermined time (e.g., 30 s, 1 minute, 2 minutes, etc.) prior to a completion of the vehicle service assignment by the autonomous vehicle.

In some implementations, the refueling task determined for the autonomous vehicle can be the second refueling task (an uninterruptible task). The computing system can determine that the autonomous vehicle is performing the second refueling task. The computing system can obtain updated energy parameters for the autonomous vehicle. The updated energy parameters can include an updated energy level of the autonomous vehicle. The computing system can determine that the updated energy level of the autonomous vehicle is above a threshold associated with the second refueling task. The computing system can determine that the autonomous vehicle is to be selected for the service request based at least in part on the updated energy level of the autonomous vehicle being above the threshold associated with the second refueling task. In response, the computing system can generate a vehicle service assignment based at least in part on the service request, at (614) and communicate the vehicle service assignment for the autonomous vehicle, at (616).

At (618), the method 600 can include obtaining feedback data. For instance, a computing system can obtain feedback data indicative of one or more previous acceptances or rejections of one or more previous refueling tasks. The refueling task for the autonomous vehicle can be determined based at least in part on the feedback data. By way of example, the autonomous vehicle can be associated with a third party vehicle provider. The feedback data can be associated with the third party vehicle provider. At least one of the first threshold associated with the first refueling task or the second threshold associated with the second refueling task can be adjusted based at least in part on the feedback data associated with the third party vehicle provider. For example, in the event that the first refueling task is consistently rejected, the computing system can adjust the energy level threshold (e.g., so that a lower fuel level is required to trigger the first refueling task).

Figure 7:
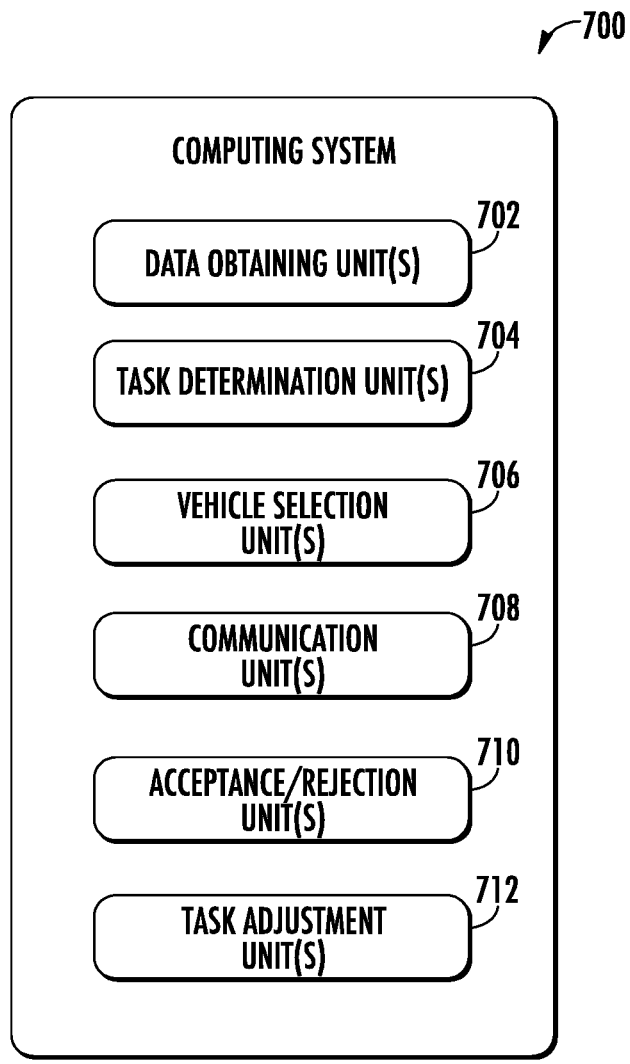
FIG. 7 depicts example units associated with a computing system for performing operations and functions according to example embodiments of the present disclosure.

Various means can be configured to perform the methods and processes described herein. FIG. 7 depicts example units associated with a computing system for performing operations and functions according to example embodiments of the present disclosure. As depicted, FIG. 7 depicts a computing system 700 that can include, but is not limited to, data obtaining unit(s) 702; task determining unit(s) 704; vehicle selection unit(s) 706; communication unit(s) 708; acceptance/rejection unit(s) 710; and task adjustment unit(s) 814. In some implementations one or more units may be implemented separately. In some implementations, one or more units may be included in one or more other units.

In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including the claims). For instance, the means (e.g., data obtaining unit(s) 702, etc.) can be configured to obtain, for example, one or more energy parameters and/or other conditions associated with an autonomous vehicle, operational capabilities, feedback data, etc. from an autonomous vehicle and/or another computing system. The means (e.g., task determination unit(s) 704, etc.) can be configured to determine a task (e.g., a refueling task) for the autonomous vehicle based at least in part on the energy parameters, other conditions, operational capabilities, feedback data, etc. associated with the autonomous vehicle. This can include, for example, a first refueling task and/or a second refueling task. The means (e.g., communication units 708, etc.) can be configured to communicate data indicative of the refueling task to the autonomous vehicle or to a computing system associated with the autonomous vehicle. The means (e.g., the acceptance/rejection units 710, etc.) can be configured to determine whether the refueling task for the autonomous vehicle has been accepted or rejected. The means (e.g., data obtaining unit(s) 702, etc.) can obtain data indicative of a service request for a vehicle service. The means (e.g., vehicle selection unit(s) 706, etc.) can be configured to determine whether to select the autonomous vehicle for the service request based at least in part on the refueling task. The means (e.g., the task determination unit 712, etc.) can be configured to generate the vehicle service assignment based at least in part on the service request. The means (e.g., data obtaining units 702, etc.) can obtain feedback data indicative of one or more previous acceptances or rejections of one or more previous refueling tasks. The means (e.g., task adjustment unit(s) 712, etc.) can be configured to adjust one or more thresholds associated with refueling task(s), priorities, etc. based at least in part on the feedback data.

Figure 8:
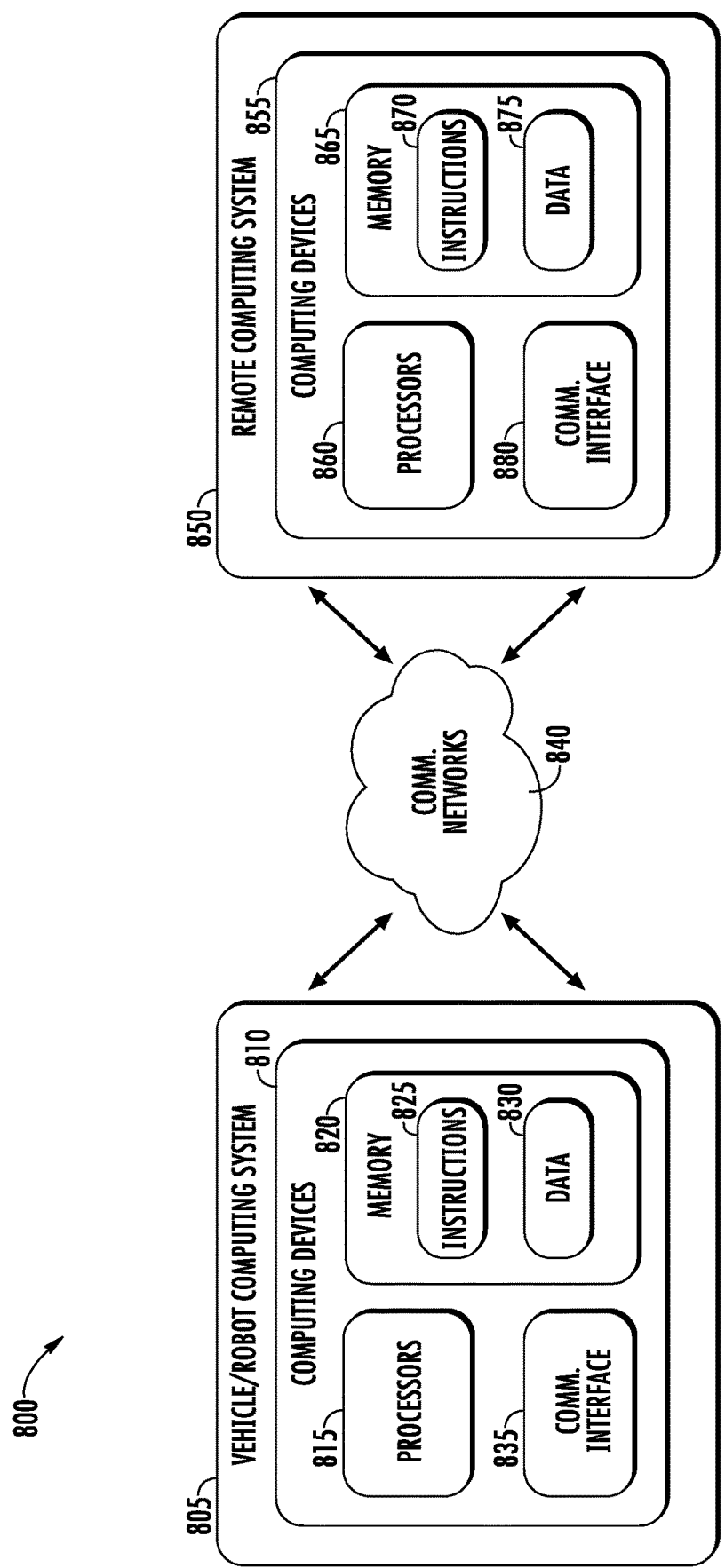
FIG. 8 depicts a block diagram of an example computing system according to example embodiments of the present disclosure.

FIG. 8 depicts a block diagram of an example computing system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a vehicle computing system 805 and a remote computing system 850. The vehicle computing system 805 can correspond to the vehicle computing system described herein with reference to FIG. 1. The remote computing system 850 can correspond to a computing system that is remote from an autonomous vehicle such as, for example, a service entity computing system (operations computing system), a third party computing system (a vehicle provider computing system), and/or another computing system. The vehicle computing system 805 and the remote computing system 850 can be communicatively coupled to one another over one or more network(s) 840.

The computing device(s) 810 of the vehicle computing system 805 can include processor(s) 815 and at least one memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, magnetic disks, data registers, etc., and combinations thereof.

The memory 820 can store information that can be accessed by the one or more processors 815. For instance, the memory 820 (e.g., one or more non-transitory computer-readable storage mediums, memory devices) can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815.

For example, the memory 820 on-board the vehicle can store instructions 825 that when executed by the one or more processors 815 cause the one or more processors 815 to perform operations such as any of the operations and functions of the computing device(s) 810 and/or the vehicle computing system (of FIG. 1), any of the operations and functions for which the vehicle computing system is configured, and/or any other operations and functions described herein.

The memory 820 can store data 830 that can be obtained (e.g., received, accessed, written, manipulated, created, generated, etc.) and/or stored. The data 830 can include, for instance, route data, user data, sensor data, map data, perception data, prediction data, motion planning data, object states and/or state data, object motion trajectories, data indicative of vehicle tasks (e.g., refueling tasks, vehicle service assignments, etc.), data indicative of acceptances/rejections, feedback data, vehicle conditions, log data, and/or other data/information as described herein. In some implementations, the computing device(s) 810 can obtain data from one or more memories that are remote from the vehicle computing system (and associated vehicle).

The computing device(s) 810 can also include a communication interface 835 used to communicate with one or more other system(s) (e.g., the remote computing system 835). The communication interface 835 can include any circuits, components, software, etc. for communicating via one or more networks (e.g., network(s) 840). In some implementations, the communication interface 835 can include, for example, one or more of a communications controller, receiver, transceiver, transmitter, port, conductors, software, and/or hardware for communicating data.

The remote computing system 850 can include one or more computing device(s) 855. The computing device(s) 855 can include one or more processors 860 and at least one memory 865. The one or more processors 860 can be any suitable processing device (e.g., a processor core, a microprocessor, an ASIC, a FPGA, a controller, a microcontroller, etc.) and can be one processor or a plurality of processors that are operatively connected. The memory 865 can include one or more tangible, non-transitory computer-readable storage media, such as RAM, ROM, EEPROM, EPROM, one or more memory devices, flash memory devices, data registers, etc., and combinations thereof.

The memory 865 can store information that can be accessed by the one or more processors 860. For instance, the memory 865 (e.g., one or more tangible, non-transitory computer-readable storage media, one or more memory devices, etc.) can include computer-readable instructions 870 that can be executed by the one or more processors 860. The instructions 870 can be software written in any suitable programming language or can be implemented in hardware. Additionally, or alternatively, the instructions 870 can be executed in logically and/or virtually separate threads on processor(s) 860.

For example, the memory 924 can store instructions 926 that when executed by the one or more processors 922 cause the one or more processors 922 to perform operations such as any of the operations and functions of an operations computing system, service entity computing system, service infrastructure, third party computing system, other system that are remote from the vehicle or for which any of these computing systems are configured, as described herein, and/or any other operations and functions described herein.

The memory 865 can store data 875 that can be obtained and/or stored. The data 875 can include, for instance, energy parameters, data indicative of operational availabilities, other vehicle conditions, data indicative of energy thresholds, service requests, data indicative of vehicle tasks (e.g., refueling tasks, vehicle service assignments, etc.), data associated with autonomous vehicles (e.g., location data, vehicle data, maintenance data, ownership data, sensor data, map data, perception data, prediction data, motion planning data, object states and/or state data, object motion trajectories, feedback data, fault data, log data, operational capabilities, etc.), third-party entity data, supply/demand data, route data, data indicative of task acceptance/rejection, feedback data, preferences of third party vehicle providers, and/or other data/information as described herein. In some implementations, the computing device(s) 855 can obtain data from one or more memories that are remote from the remote computing system 850.

The computing device(s) 855 can also include a communication interface 880 used to communicate with one or more other system(s) (e.g., the vehicle computing system, etc.). The communication interface 880 can include any circuits, components, software, etc. for communicating via one or more networks (e.g., network(s) 840). In some implementations, the communication interface 880 can include, for example, one or more of a communications controller, receiver, transceiver, transmitter, port, conductors, software, and/or hardware for communicating data.

The network(s) 840 can be any type of network or combination of networks that allows for communication between devices. In some embodiments, the network(s) 840 can include one or more of a local area network, wide area network, the Internet, secure network, cellular network, mesh network, peer-to-peer communication link, and/or some combination thereof, and can include any number of wired or wireless links. Communication over the network(s) 840 can be accomplished, for instance, via a communication interface using any type of protocol, protection scheme, encoding, format, packaging, etc.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computing system for autonomous vehicle energy replenishment comprising:
at least one processor programmed to perform operations comprising:
obtaining energy parameter data describing at least one energy parameter associated with a first autonomous vehicle;
determining an energy replenishment task for the first autonomous vehicle based at least in part on the energy parameter data;
accessing data indicative of whether the energy replenishment task for the first autonomous vehicle has been accepted or rejected;
obtaining data indicative of a service request for a vehicle service; and
selecting the first autonomous vehicle or a second autonomous vehicle for the service request, the selecting being based at least in part on the energy replenishment task and whether the energy replenishment task for the first autonomous vehicle has been accepted or rejected.

2. The computing system of claim 1, the operations further comprising:
determining that the energy replenishment task for the first autonomous vehicle is interruptible by a vehicle service assignment; and
responsive to determining that the energy replenishment task for the first autonomous vehicle is interruptible by a vehicle service assignment, selecting the first autonomous vehicle for the service request.

3. The computing system of claim 2, the operations further comprising:
generating a vehicle service assignment based at least in part on the service request; and
communicating data indicative of the vehicle service assignment to the first autonomous vehicle.

4. The computing system of claim 3, the communicating data indicative of the vehicle service assignment to the first autonomous vehicle comprising at least one of communicating the data directly to the first autonomous vehicle and communicating the data to a computing system associated with the first autonomous vehicle.

5. The computing system of claim 3, the vehicle service assignment being associated with a higher priority than a priority of the energy replenishment task.

6. The computing system of claim 2, the operations further comprising:
communicating a request to cancel the energy replenishment task for the first autonomous vehicle based at least in part on the service request.

7. The computing system of claim 6, the operations further comprising:
communicating data indicative of the energy replenishment task for the first autonomous vehicle after or at a predetermined time prior to a completion of a vehicle service assignment based on the service request.

8. The computing system of claim 2, the determining that the energy replenishment task for the first autonomous vehicle is interruptible by a vehicle service assignment comprising:
determining that an energy level of the first autonomous vehicle is less than a first energy threshold and greater than a second energy threshold, wherein the first energy threshold is greater than the second energy threshold.

9. The computing system of claim 1, the operations further comprising:
determining that the energy replenishment task for the first autonomous vehicle is not interruptible by a vehicle service assignment; and
responsive to determining that the energy replenishment task for the first autonomous vehicle is not interruptible by a vehicle service assignment, selecting the second autonomous vehicle for the service request.

10. The computing system of claim 1, the selecting the first autonomous vehicle or the second autonomous vehicle for the service request comprising:
determining that the energy replenishment task for the first autonomous vehicle is not interruptible by a vehicle service assignment;
obtaining updated energy parameter data describing the first autonomous vehicle during the energy replenishment task;
determining, using the updated energy parameter data, that an updated energy level of the first autonomous vehicle is above a threshold energy level; and
determining that the first autonomous vehicle is to be selected for the service request based at least in part on the updated energy level of the first autonomous vehicle being above the threshold energy level.

11. The computing system of claim 1, the operations further comprising obtaining data indicative of one or more operational capabilities of the first autonomous vehicle, the determining of the energy replenishment task for the first autonomous vehicle being based at least in part on the one or more operational capabilities of the first autonomous vehicle.

12. The computing system of claim 1, the operations further comprising obtaining feedback data indicative of one or more previous acceptances or rejections of one or more previous energy replenishment tasks, the determining of the energy replenishment task for the first autonomous vehicle being based at least in part on the feedback data.

13. The computing system of claim 12, wherein the first autonomous vehicle is associated with a third-party vehicle provider, the feedback data being associated with the third-party vehicle provider, and at least one of a first threshold associated with the energy replenishment task being interruptible by a vehicle service assignment or a second threshold associated with the energy replenishment task not being interruptible by a vehicle service assignment.

14. A method for autonomous vehicle energy replenishment comprising:
- obtaining, by a computing system including one or more computing devices, energy parameter data describing at least one energy parameter associated with a first autonomous vehicle;
- determining, by the computing system, an energy replenishment task for the first autonomous vehicle based at least in part on the energy parameter data;
- accessing data indicative of, by the computing system, whether the energy replenishment task for the first autonomous vehicle has been accepted or rejected;
- obtaining, by the computing system, data indicative of a service request for a vehicle service; and
- selecting, by the computing system, the first autonomous vehicle or a second autonomous vehicle for the service request, the selecting being based at least in part on the energy replenishment task and whether the energy replenishment task for the first autonomous vehicle has been accepted or rejected.

15. The method of claim 14, further comprising:
- determining that the energy replenishment task for the first autonomous vehicle is interruptible by a vehicle service assignment; and
- responsive to determining that the energy replenishment task for the first autonomous vehicle is interruptible by a vehicle service assignment, selecting the first autonomous vehicle for the service request.

16. The method of claim 15, further comprising:
- generating, by the computing system, a vehicle service assignment based at least in part on the service request; and
- communicating, by the computing system, data indicative of the vehicle service assignment to the first autonomous vehicle.

17. The method of claim 16, the communicating data indicative of the vehicle service assignment to the first autonomous vehicle comprising at least one of: communicating the data directly to the first autonomous vehicle and communicating the data to a computing system associated with the first autonomous vehicle.

18. The method of claim 16, wherein the vehicle service assignment is associated with a higher priority than a priority of the energy replenishment task.

19. The method of claim 15, further comprising:
- communicating, by the computing system, a request to cancel the energy replenishment task for the first autonomous vehicle based at least in part on the service request.

20. A non-transitory computer readable medium comprising instructions thereon that, when executed by at least one processor, cause the at least one processor to perform operations comprising:
- obtaining energy parameter data describing at least one energy parameter associated with a first autonomous vehicle;
- determining an energy replenishment task for the first autonomous vehicle based at least in part on the energy parameter data;
- accessing data indicative of whether the energy replenishment task for the first autonomous vehicle has been accepted or rejected;
- obtaining data indicative of a service request for a vehicle service; and
- selecting the first autonomous vehicle or a second autonomous vehicle for the service request, the selecting being based at least in part on the energy replenishment task and whether the energy replenishment task for the first autonomous vehicle has been accepted or rejected.

* * * * *